United States Patent
Yamada et al.

(10) Patent No.: US 9,971,968 B2
(45) Date of Patent: May 15, 2018

(54) DETERMINATION METHOD, SYSTEM AND RECORDING MEDIUM

(71) Applicant: FUJITSU LIMITED, Kawasaki-shi, Kanagawa (JP)

(72) Inventors: Wakana Yamada, Numazu (JP); Kiichi Yamada, Numazu (JP); Mitsuhiro Kinomura, Fuji (JP)

(73) Assignee: FUJITSU LIMITED, Kawasaki (JP)

( * ) Notice: Subject to any disclaimer, the term of this patent is extended or adjusted under 35 U.S.C. 154(b) by 764 days.

(21) Appl. No.: 14/498,100

(22) Filed: Sep. 26, 2014

(65) Prior Publication Data
US 2015/0012475 A1    Jan. 8, 2015

Related U.S. Application Data

(63) Continuation of application No. PCT/JP2012/002210, filed on Mar. 29, 2012.

(51) Int. Cl.
*G06F 17/00* (2006.01)
*G06N 7/00* (2006.01)
(Continued)

(52) U.S. Cl.
CPC .............. *G06N 5/02* (2013.01); *G06F 17/10* (2013.01); *G06F 2217/16* (2013.01)

(58) Field of Classification Search
CPC ............. G06N 5/02; G06N 5/022; G06N 5/04
(Continued)

(56) References Cited

U.S. PATENT DOCUMENTS 8,161,261 B2 * 4/2012 Kinomura .............. G06Q 10/00 711/153
8,554,780 B2 * 10/2013 Kinomura ......... G06F 17/30961 707/713
(Continued)

FOREIGN PATENT DOCUMENTS

JP    6-149927    5/1994
JP    7-105223    4/1995
(Continued)

OTHER PUBLICATIONS

The practical aspects of TPS resource data discovery Larry V. Kirkland 2016 IEEE AUTOTESTCON Year: 2016 pp. 1-5 IEEE Conferences.*
(Continued)

*Primary Examiner* — Michael B Holmes
(74) *Attorney, Agent, or Firm* — Staas & Halsey LLP

(57) ABSTRACT

A determination method includes: generating, when a logical formula is received, another statement group that shares either one of individual statements and one or plural statements of statement groups with each of the individual statements and statement groups that are included in the logical formula or a changed logical formula acquired with the performance of logically equivalent conversion with regard to the logical formula, the logical formula or the changed logical formula including a logical disjunction of the individual statements or the statement groups that are logical conjunctions of the one or plural statements; and performing a determination process of the logical formula, wherein the logical formula is determined as not satisfied when a determination result indicating that the statements that are included in the other statement group are not satisfied is obtained in the determination process.

13 Claims, 25 Drawing Sheets

(51) Int. Cl.
*G06N 7/08* (2006.01)
*G06N 5/02* (2006.01)
*G06F 17/10* (2006.01)

(58) Field of Classification Search
USPC .......................................................... 706/55
See application file for complete search history.

(56) References Cited

U.S. PATENT DOCUMENTS

| | | | | |
|---|---|---|---|---|
| 8,667,008 | B2* | 3/2014 | Yamada | G06F 17/30442 707/769 |
| 9,147,011 | B2* | 9/2015 | Yamada | G06F 17/30663 |
| 9,619,516 | B2* | 4/2017 | Moriyama | G06Q 30/00 |
| 9,779,071 | B2* | 10/2017 | Kataoka | G06F 17/2258 |
| 2003/0167182 | A1* | 9/2003 | Bloom | G06F 8/10 705/7.37 |
| 2009/0234801 | A1* | 9/2009 | Moor | G06F 17/30536 |

FOREIGN PATENT DOCUMENTS

| | | |
|---|---|---|
| JP | 2009-211312 | 9/2009 |
| JP | 2010-266942 | 11/2010 |

OTHER PUBLICATIONS

A Data Collection and Analysis System for Mobile Group Marketing Weiran Chen; Yipeng Pei; Xufang Wang; Chao Ma; Zhibo Wang; Weiping Zhu 2015 International Conference on Cloud Computing and Big Data (CCBD) Year: 2015 pp. 223-230 IEEE Conferences.*
SQL-based heuristics for selected Kdd tasks over large data sets Marcin Kowalski; Sebastian Stawicki 2012 Federated Conference on Computer Science and Information Systems (FedCSIS) Year: 2012 pp. 303-310 IEEE Conferences.*
Classifying a program code for parallel computing against HPCC Mustafa Basthikodi; Waseem Ahmed 2016 Fourth International Conference on Parallel, Distributed and Grid Computing (PDGC) Year: 2016 pp. 512-516 IEEE Conferences.*
International Search Report dated Jul. 10, 2012 in corresponding international application PCT/JP2012/002210.

* cited by examiner

FIG. 10

| RECEPTION DATE AND TIME | SEARCH REQUEST ORIGIN | SEARCH CONDITION EXPRESSION | MATCH TABLE | SEARCH RESULT |
|---|---|---|---|---|
| 20120301161 8.2311 | 192.0.2.0 | (A and (B or C) and D) or E or (F and G) | T2 | ad1,ad2,... |
| 20120301161 8.2350 | 198.51.100.0 | H and I and (J or k) or L | Tx | |
| ... | ... | ... | ... | ... |

| NODE | [TRUE] CHILD NODE | | | [FALSE] CHILD NODE | | |
|---|---|---|---|---|---|---|
| [TRUE] START POINT | A | E | F | | | |
| [TRUE] START POINT | | | | A | B | D |
| A | B | C | | E | | |
| B | D | | | C | | |
| C | D | | | E | | |
| D | [TRUE] END POINT | | | E | | |
| E | [TRUE] END POINT | | | F | G | |
| F | G | | | [FALSE] END POINT | | |
| G | [TRUE] END POINT | | | [FALSE] END POINT | | |

FIG. 11B

| NODE | DETERMINATION RESULT | CHILD NODE |
|---|---|---|
| START POINT | - | A |
| A | TRUE | B |
| A | FALSE | E |
| B | TRUE | D |
| B | FALSE | C |
| C | TRUE | D |
| C | FALSE | E |
| D | TRUE | TRUE |
| D | FALSE | E |
| E | TRUE | TRUE |
| E | FALSE | F |
| F | TRUE | G |
| F | FALSE | FALSE |
| G | TRUE | TRUE |
| G | FALSE | FALSE |

FIG. 11C

| NODE | DETERMINATION RESULT | CHILD NODE |
|---|---|---|
| START POINT | - | D |
| D | FALSE | E |
| E | FALSE | F |
| F | FALSE | FALSE |

FIG. 12A

| C | E | F |
|---|---|---|

FIG. 12B

| E | | |
|---|---|---|

FIG. 13

| STATEMENT | DETERMINATION RESULT |
|---|---|
| A | |
| B | |
| C | |
| D | |
| E | |
| F | |
| G | |

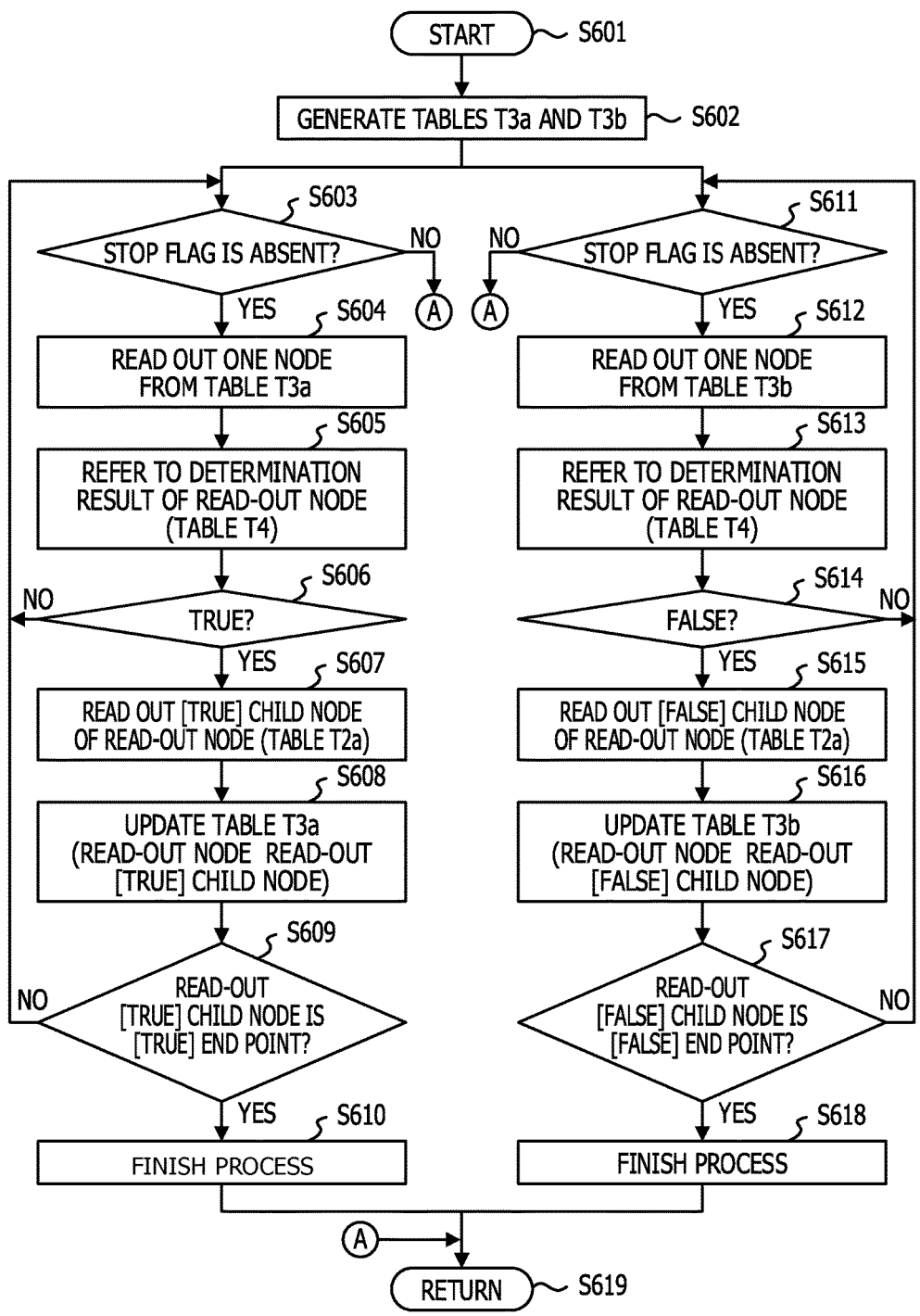

US 9,971,968 B2

DETERMINATION METHOD, SYSTEM AND RECORDING MEDIUM

CROSS-REFERENCE TO RELATED APPLICATION

This application is a continuation application of International Application PCT/JP2012/002210 filed on Mar. 29, 2012, the entire contents of which are incorporated herein by reference.

FIELD

The embodiment discussed herein is related to a determination technology for a logical formula.

BACKGROUND

A method has been known that performs a determination process of a logical formula that includes a logical disjunction or a logical conjunction of one or plural statements by using a binary decision diagram (BDD). In the method, when the logical formula is received, a BDD is formed based on the received logical formula. A BDD defines a determination order of statements included in a logical formula and also defines determination results ("true" or "false") of a statement that is a next determination target or the entire logical formula for both determination results of "true" and "false" of each statement.

For example, a method has been known that increases the possibility that a cost of a determination process of an entire logical formula decreases by using a BDD in which a statement with a lower calculation cost of the determination process is first determined. For example, Japanese Laid-open Patent Publication No. 2009-211312 is known as related art.

SUMMARY

According to an aspect of the invention, a determination method includes: generating, when a logical formula is received, another statement group that shares either one of individual statements and one or plural statements of statement groups with each of the individual statements and statement groups that are included in the logical formula or a changed logical formula acquired with the performance of logically equivalent conversion with regard to the logical formula, the logical formula or the changed logical formula including a logical disjunction of the individual statements or the statement groups that are logical conjunctions of the one or plural statements; and performing a determination process of the logical formula, wherein the logical formula is determined as not satisfied when a determination result indicating that the statements that are included in the other statement group are not satisfied is obtained in the determination process.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 illustrates an example of a management table;

FIGS. 11A, 11B, and 11C illustrate examples of a logical determination table;

FIGS. 12A and 12B illustrate examples of state information;

FIG. 13 illustrates an example of determination information;

FIG. 23 illustrates an example of a flowchart of a process of a logical determination section.

DESCRIPTION OF EMBODIMENT

In a determination process that uses a BDD, there is a case where the determination process goes through most statements that are included in a logical formula to obtain a determination result of the entire logical formula.

It is desirable to reduce speed degradation of the determination process of the entire logical formula.

Figure 1:
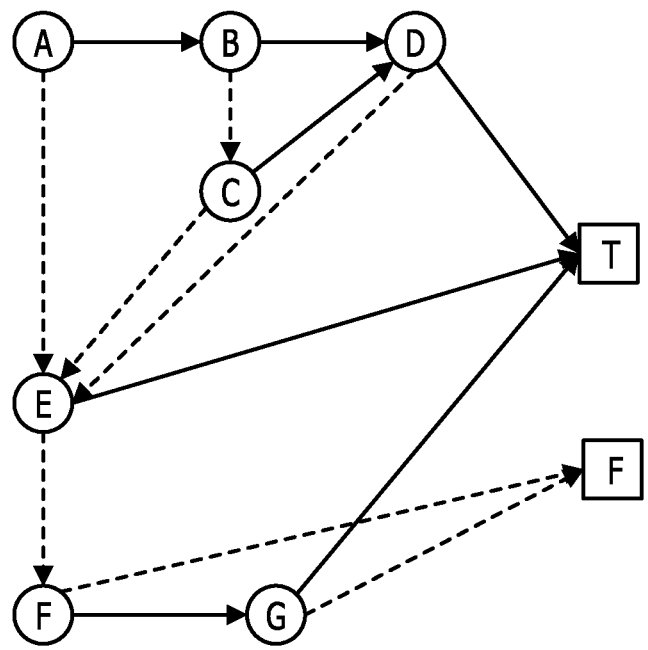
FIG. 1 illustrates an example of a binary decision diagram.

A method is known that creates a binary decision diagram (BDD) based on a logical formula and uses the created BDD to determine whether or not the logical formula is satisfied. FIG. 1 illustrates an example of a BDD. The BDD illustrated in FIG. 1 is based on a logical formula "(A and (B or C) and D) or E or (F and G)". This logical formula is merely an example, and a matter that is described below with the logical formula "(A and (B or C) and D) or E or (F and G)" is not limited to this logical formula but hold true for other logical formulae. A symbol A in the logical formula represents a statement that "determination target data include data A", for example. The statement A is determined as "true" when the determination target data include data A. The determination target data are data in forms of strings, images, sounds, and so forth, for example. These fundamentals are the same for statements B, C, D, E, F, and G. An operator "and" is of a logical conjunction. An operator "or"

is of a logical disjunction. In a determination process that uses a BDD, when the determination result of the statement is "true", the determination process proceeds to the determination of the statement that is pointed by a solid-line arrow. When the determination result of the statement is "false", the determination process proceeds to the determination of the statement that is pointed by a broken-line arrow. For example, in the BDD illustrated in FIG. 1, a determination is made whether or not the statement A is satisfied ("true" or "false"). Thereafter, if the determination result of the statement A is "true", the determination of the statement B is made. If the determination result of the statement A is "false", the determination of the statement E is made. The BDD further has pieces of information that are "true (T)" and "false (F)". The determinations of the statements are made in an order based on the BDD. In the BDD in FIG. 1, for example, when the determination result of the statement E is "true", it is determined that the data satisfies the entire logical formula ("true (T)").

In a case where the determination process of the logical formula is made by using the BDD in FIG. 1, the number of statements for which determination results are desired may vary depending on the determination target data. For example, for a record that includes the statements A, C, and F, the determination process is made in the order of statement A (true)→statement B (false)→statement C (true)→statement D (false)→statement E (false)→statement F (true)→statement G (false)→"false", and the number of statements for which the determination results are desired is seven. Further, for a record that does not include any of the statements A to G, the determination process is made in the order of statement A (false)→statement E (false)→statement F (false)→"false", and the number of statements for which the determination results are desired is three.

In the above logical formula, three logical formulae are connected by the logical disjunction operator, the logical formula is satisfied if any of the three logical formulae is satisfied. This form is referred to as disjunctive normal form. Logical formulae that include the logical disjunction operator, the logical conjunction operator, and a logical negation operator may be converted into the disjunctive normal form by laws that perform logically equivalent conversion such as the double negative elimination, De Morgan's law, and distributive law. The three logical formulae are a logical formula "(A and (B or C) and D)", a logical formula "E", and a logical formula "(F and G)". On the other hand, the above logical formula is not satisfied even if a portion of each of the three logical formulas is not satisfied. For example, the above logical formula is not satisfied when the statement D (a portion of the logical formula (A and (B or C) and D)), the statement E, or the statement F (a portion of the logical formula (F and G)) is not satisfied.

Thus, for example, in a case where the determination process of whether any of the statements D, E, and F is not satisfied ("false") and the determination result that all the statements D, E, and F are "false" is thereby obtained prior to the result of the determination process based on the BDD in FIG. 1, the determination process based on the BDD in FIG. 1 may be finished. This is because, if all the statements D, E, and F are "false", it is obvious that the entire logical formula is "false" without obtaining the determination result of the logical formula based on the BDD. The number of statements for which the determination results are desired is seven in the determination process based on the BDD in FIG. 1 for the above-described record that includes the statements A, C, and F. However, the determination result of the entire logical formula may be obtained by the determination results of the three statements D, E, and F.

Times taken for the determination process of the statements that are included in the logical formula may mutually be different. When the sizes of the determination target data and data to be matched (data "A" for the statement A) are different, computation amounts for matching are different. Further, for example, in a case where an error occurs in data readout in the determination process of a certain statement, the process takes time regardless of contents of the statement.

As described above, for example, for the record that includes the statements A, C, and F, the determination process is made in the order of statement A (true)→statement B (false)→statement C (true)→statement D (false)→statement E (false)→statement F (true)→statement G (false)→"false", and the determination process is made for the seven statements. For example, if a long time is taken for the process for the statement C that is included in the logical formula, the process time used for the determination of the statement C is extended, and a long time is thus desired for an entire search process that is made based on the BDD in FIG. 1 for the record that includes the statements A, C, and F. However, in a case where the results of the determination process of the statements D, E, and F that are known to be "false" prior to obtainment of the result of the determination process of the statement C, extension of the process time of the determination process of the entire logical formula is reduced even if the determination process of the statement C takes time.

Such a determination process of the logical formula is used for a search process, for example. The search condition is expressed in a logical formula, the determination process of whether or not data that are sequentially read out from a database satisfy the logical formula, the data that satisfy the logical formula are returned as data that match the search condition, and so forth, thereby performing the search process.

Figure 2:
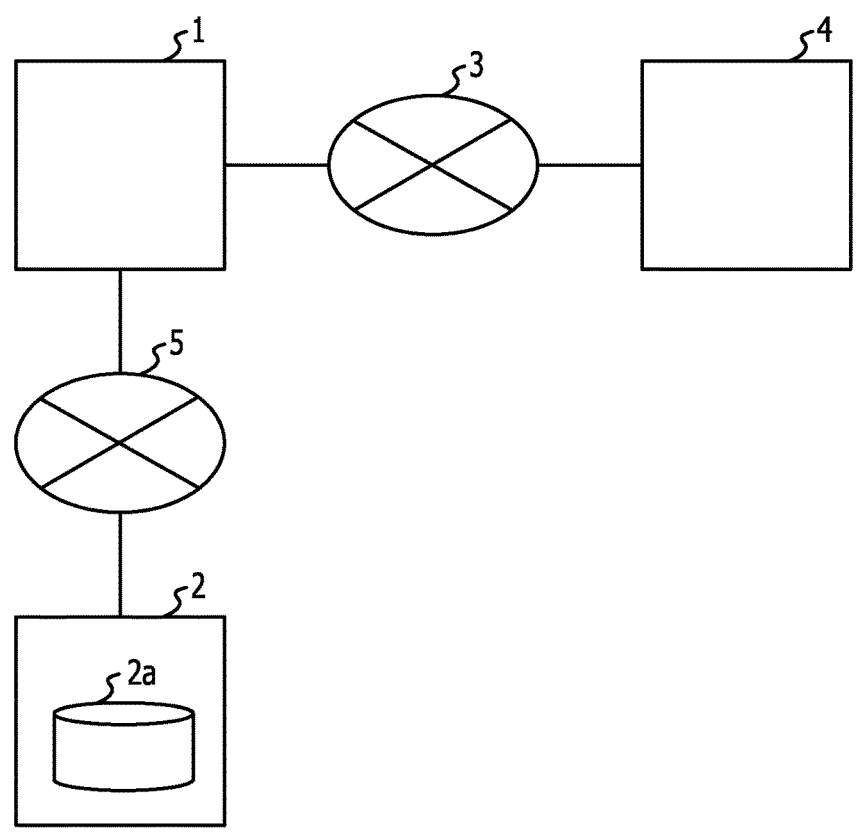
FIG. 2 illustrates an example of a system configuration according to the embodiment.

FIG. 2 illustrates an example of a system configuration according to the embodiment. The system illustrated in FIG. 2 includes a computer 1, a storage device 2, a network 3, a computer 4, and a network 5. The computer 1 performs, for example, a storage process, management, and a search process for a file that is stored in the storage device 2. The storage device 2 includes a record medium 2a and performs data writing in and data readout from the record medium 2a in response to control by the computer 1. The computer 4 communicates with the computer 1 via the network 3. The computer 4 transmits a search request to the computer 1 and receives a search result from the computer 1, for example. Further, the computer 4 uploads a file to the computer 1, for example. The number of computers 4 is not limited to the number illustrated in FIG. 1. The network 3 is a network such as the Internet or an intranet, for example. The computer 1 communicates with the storage device 2 via the network 5. The network 5 may be the Internet or an intranet or may be a network that uses Fibre Channel, such as a storage area network (SAN). For example, in a case where a search request is received from the computer 4, the computer 1 searches for a file that is stored in the storage device 2 based on the search request, and transmits a search result to the computer 4. Further, for example, in a case where an upload request of a file is received from the computer 4, the computer 1 writes the file that is represented by the upload request in the record medium 2a included in the storage device 2.

Figure 3:
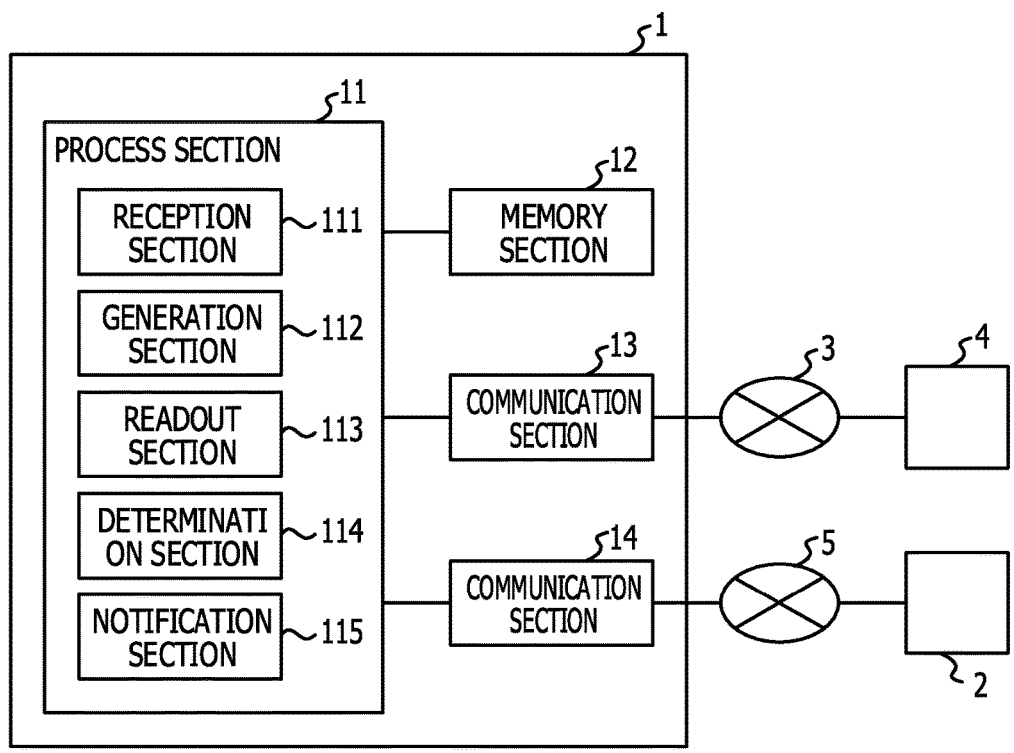
FIG. 3 illustrates an example of a function configuration of a computer 1 of the system illustrated in FIG. 2.

FIG. 3 illustrates an example of a function configuration of the computer 1 of the system configuration illustrated in FIG. 2. The computer 1 includes a process section 11, a memory section 12, a communication section 13, and a communication section 14. The process section 11 includes a reception section 111, a generation section 112, a readout section 113, a determination section 114, and a notification section 115. The process section 11 performs computation related to a search process, a file management process, and a file storage process in the storage device 2, and control of the memory section 12, the communication section 13, and the communication section 14. The memory section 12 stores data as a work area of the process section 11. The communication section 13 performs a communication process with the computer 4 via the network 3. The communication section 14 performs a communication process with the computer 2 via the network 5.

The reception section 111 receives a search request from the computer 4 via the communication section 13 and writes information in a management table T1 (see FIG. 10) that is stored in the memory section 12 for the received search request, for example. The generation section 112 generates a logical determination table T2 (see FIGS. 11A, 11B and 11C) that is used for the determination process of a logical formula based on a logical formula of a search condition that is included in the search request received by the reception section 111.

The logical determination table T2 that is generated by the generation section 112 is used in the logical determination by the determination section 114 (or a logical determination section 1141 described below). The logical determination table T2 includes information of the relationship between a set of a statement and its determination result and another statement. For example, information that indicates the determination result of one or plural statements or an entire logical formula is related to one set of a statement and its determination result. A relationship among the statements are determined by the generation section 112 based on the logical formula that is received by the reception section 111. A generation method of the logical determination table T2 will later be described in detail. For example, the logical determination table T2 that is created for the logical formula "(A and (B or C) and D) or E or (F and G)" may include the relationship among all the statements that are indicated in FIG. 1. For example, each record that is included in the logical determination table T2 includes information that indicates a relationship such as statement A (true)→statement B (false)→statement C, and so forth.

Further, in a case where a logical formula provides a logical disjunction (as described above, the logical formula may be converted into a disjunctive normal form) of a statement group (that includes one or plural statements), the logical determination table T2 indicates at least the relationship among statements that are included in a statement group that shares at least one statement with each of plural statement groups that are mutually connected by the logical disjunction operator. That is, the generation section 112 selects at least one statement from individual statements and each of statement groups that are mutually connected by the logical disjunction operator in the logical formula that is received by the reception section 111 and generates information that indicates the relationship among the statements (the relationship between the determination result and a statement to be next determined) that are included in selected plural statements (hereinafter referred to as selected statement group). In this case, the statement groups that are mutually connected by the logical disjunction operator in the logical formula are one or plural statements that are connected by the logical conjunction operator. In a case where a statement is selected from the statement groups that are mutually connected by the logical disjunction operator as described above, the generation section 112 selects any of one or plural statements that are mutually connected by the logical conjunction operator. The selected statement group that is selected by the generation section 112 includes the statements D, E, and F with respect to the logical formula "(A and (B or C) and D) or E or (F and G)", for example. With respect to the logical formula "(A and (B or C) and D) or E or (F and G)" that is a logical disjunction of a statement group that is a logical conjunction of individual statements or one or plural statements, the statement group that includes the statements D, E, and F includes either one of an individual statement or one or plural statements that are included in a statement group in common with the individual statements and the statement groups that are included in the logical formula "(A and (B or C) and D) or E or (F and G)". In this case, the created logical determination table T2 indicates the relationship of statement D (false)→statement E, statement E (false)→statement F, and statement F (false)→"false", for example.

The readout section 113 reads out data that are stored in the storage device 2 via the communication section 14 when the generation section 112 generates the logical determination table T2. The determination section 114 performs the determination process of a logical formula for the data that are read out by the readout section 113 based on the logical determination table T2. In a case where data that satisfy the logical formula are present as a result of the determination process, the determination section 114 writes the data in the management table T1. In a case where no datum that satisfies the logical formula is present as a result of the determination process, the determination section 114 writes the fact that the data are not present in the management table T1. In a case where the determination section 114 finishes the determination process, the notification section 115 generates response information to the search request based on the information that is written in the management table T1 and controls the communication section 13 to transmit the generated response information to the computer 4.

Figure 4:
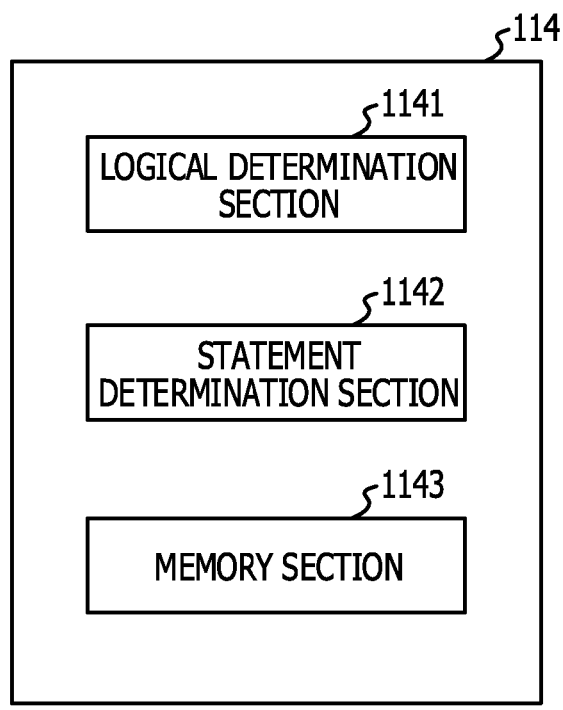
FIG. 4 illustrates an example of a function configuration of a determination section that is included in the computer 1.

FIG. 4 illustrates an example of a function configuration of the determination section 114 that is included in the computer 1. The determination section 114 includes the logical determination section 1141, a statement determination section 1142, and a memory section 1143, for example. The logical determination section 1141 performs a determination of the entire logical formula for data that are read out by the readout section 113 in accordance with the logical determination table T2 that is generated by the generation section 112 and a determination result by the statement determination section 1142. The statement determination section 1142 performs a determination process of each statement that is included in the logical formula for the data that are read out by the readout section 113. The memory section 1143 stores a result of the determination of each statement by the statement determination section 1142. Determination information that is stored by the memory section 1143 is updated by the statement determination section 1142. Further, the memory section 1143 stores state information that indicates a determination status of the logical determination section 1141. The state information that is stored by the memory section 1143 is updated by the logical determination section 1141. The state information includes two kinds of information that are illustrated in FIG. 12, for example. For example, parallel processing is performed between the logical determination section 1141 and the statement determination section 1142. In addition, for example, parallel processing is performed in each of the logical determination section 1141 and the statement determination section 1142.

The process of the logical determination section 1141 will further be described. The logical determination section 1141 decides a target statement by referring to the logical determination table T2, for example. Next, the logical determination section 1141 reads out a result of a determination of the target statement by the statement determination section 1142, further reads out another statement that is related to a set of the target statement and the determination result of the statement in the logical determination table T2, and sets the other statement as a next target statement, for example. In a case where the determination result by the statement determination section 1142 is not obtained, the logical determination section 1141 stands by until the determination result is obtained while retaining information that identifies the target statement, for example. In a case where information is repeatedly read out from the logical determination table T2 and information that indicates the determination result of the entire logical formula is read out from the logical determination table T2, the logical determination section 1141 finishes the process for the data that are read out by the readout section 113. In a case where the determination result of the entire logical formula is true, information that indicates determination target data is stored in the management table T1.

The logical determination section 1141 further performs, in addition to the above process, a process for tracing the relationship in the selected statement group that is selected by the generation section 112 by referring to the logical determination table T2. For example, in the logical formula "(A and (B or C) and D) or E or (F and G)", a determination result is traced in an order such as statement D (false) →statement E (false)→statement F (false)→"false". When the determination result may not be traced in a case where, for example, the statement E is true, the logical determination section 1141 finishes this process.

The logical determination section 1141 may refer to a determination result of a statement in the same procedure as the BDD illustrated in FIG. 1 by tracing the relationship that is indicated in a logical determination table T2b in FIG. 11B, for example. However, in such a case, the logical determination section 1141 at the same time performs a process for tracing the relationship among statement groups that shares at least one statement with each of plural statement groups that are mutually connected by the logical disjunction operator by using a logical determination table T2c in FIG. 11C. Alternatively, the logical determination section 1141 may on one hand trace the relationship among statements in a case where the determination result of the statement is true and may on the other hand trace the relationship among the statements in a case where the determination result of the statement is false by using the logical determination table T2a, for example. The logical determination tables T2a, T2b, and T2c will later be described.

When a process is performed by a computer in the function configuration that is illustrated in FIGS. 3 and 4, even in a case where the determination goes through most statements that are included in the logical formula when the BDD is used, extension of time for outputting the determination result of the entire logical formula may be avoided. For example, the logical determination section 1141 traces at least the relationship among statements in statement groups that share at least one statement with each of plural statement groups that are mutually connected by the logical disjunction operator. In this case, if all the statement groups that share at least one statement with the plural statement groups are false, it is obvious that the entire logical formula is false. Even if the determination process that uses the BDD takes time, the determination process of the entire logical formula may be finished.

Figure 5:
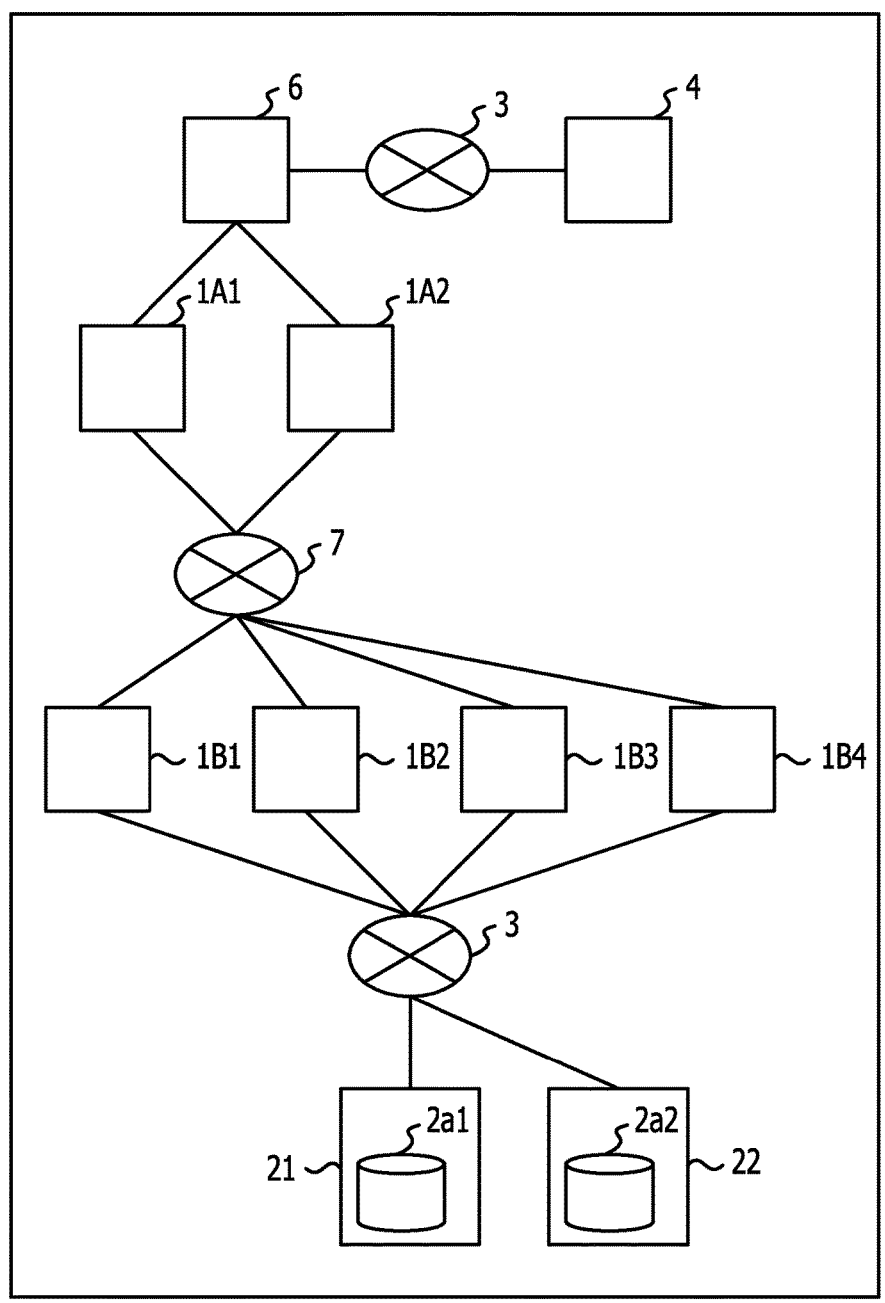
FIG. 5 illustrates another example of a system configuration according to the embodiment.

FIG. 5 illustrates another example of a system configuration according to the embodiment. The system that is illustrated in FIG. 2 may be configured as illustrated in FIG. 5. In the system in FIG. 5, a function of the computer 1 that is illustrated in FIG. 2 is implemented by plural computers. For example, the system includes computers 1A1, 1A2, 1B1, 1B2, 1B3, and 1B4 instead of the computer 1 in FIG. 2, and a load balancer 6 and a network 7. The computers 1A1 and 1A2 perform reception of a search request and response of a search result to the search request and use the computers 1B1 to 1B4 to perform control for executing the search process. The computers 1B1 to 1B4 perform a determination process of a logical formula that is included in the search request in response to the control by the computer 1A1 and 1A2. The two computers 1A1 and 1A2 and the four computers 1B1 to 1B4 are provided. However, the number of computers is not limited to this. For example, in a case where the number of search requests increases, the number of computers 1A1 and 1A2 may accordingly be increased. In this case, the number of computers 1B1 to 1B4 may be increased because the number of determination processes of logical formulae increases. In addition, the number of computers 1B1 to 1B4 may be increased depending on a performance requirement for the search process. Plural computers perform parallel processing on one search request by distributing areas of search target data, and the search process may be performed in a shorter time. The load balancer 6 performs a process for allocating the search request that is transmitted from the computer 4 to either one of the computers 1A1 and 1A2, for example. The network 7 is a network such as local area network (LAN), for example, and couples the computers 1A1 and 1A2 and the computers 1B1 to 1B4.

Figure 6:
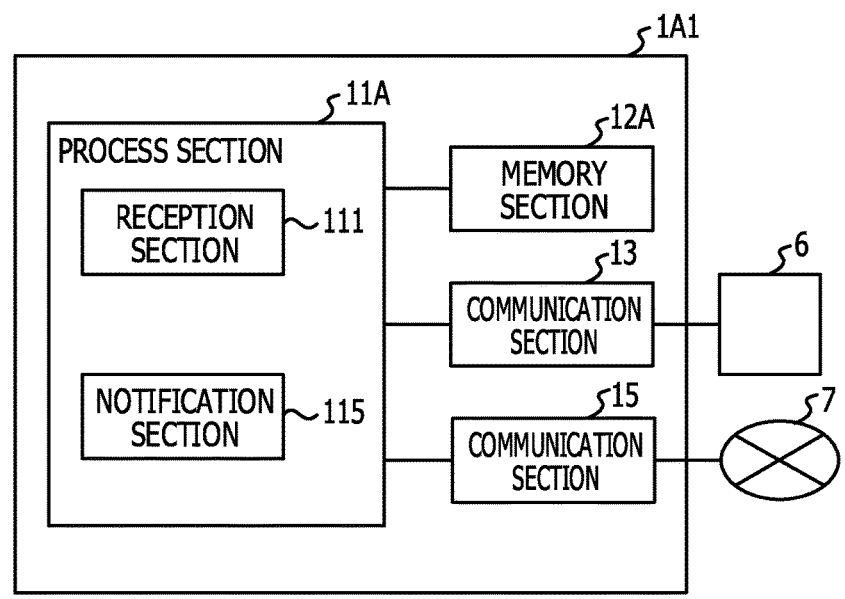
FIG. 6 illustrates an example of a function configuration of a computer 1A1 of the system illustrated in FIG. 5.

FIG. 6 illustrates an example of a function configuration of the computer 1A1 of the system configuration illustrated in FIG. 5. The computer 1A1 includes a process section 11A, a memory section 12A, the communication section 13, and a communication section 15. The process section 11A includes the reception section 111 and the notification section 115. In a case where the reception section 111 receives a search request from the computer 4 via the load balancer 6 and the communication section 13, for example, the reception section 111 makes the communication section 15 transmit a designation of a data area that is the target of the determination process and a request of the determination process based on the received search request to each of the computers 1B1 to 1B4. The communication section 15 performs a communication process via the network 7. In a case where the notification section 115 receives results of the determination process from the computers 1B1 to 1B4 via the communication section 15, the notification section 115 performs a response based on the received results to the computer 4. The memory section 12A is a work area that stores data used for a process of the process section 11A and stores the data areas that are allocated to the computers 1B1 to 1B4, for example.

Figure 7:
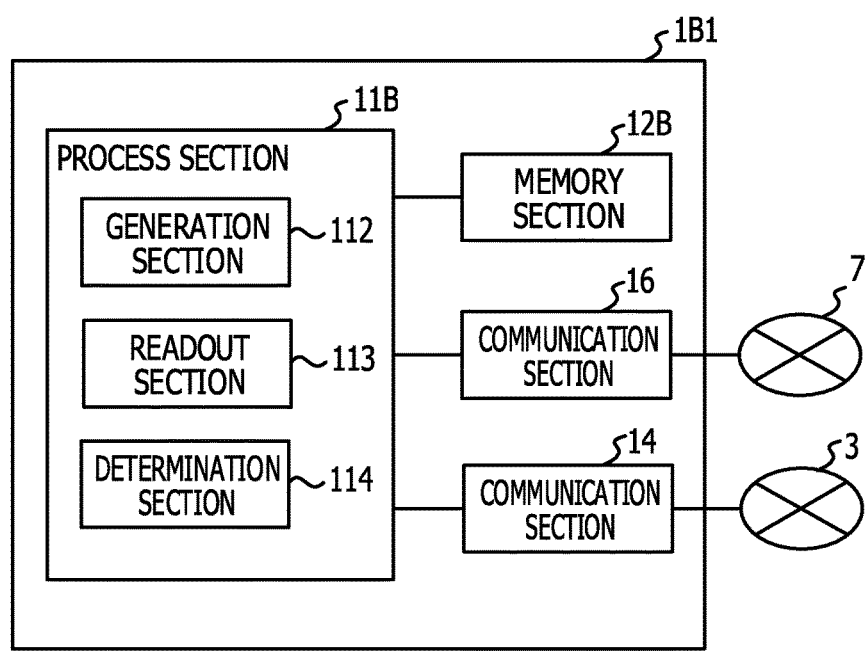
FIG. 7 illustrates an example of a function configuration of a computer 1B1 of the system illustrated in FIG. 5.

FIG. 7 illustrates an example of a function configuration of the computer 1B1 of the system configuration illustrated in FIG. 5. The computer 1B1 includes a process section 11B, a memory section 12B, the communication section 14, and a communication section 16. The process section 11B includes the generation section 112, the readout section 113, and the determination section 114. The communication section 16 performs a communication process via the network 7. The generation section 112 generates the logical determination table T2 based on a request of the determination process that is received from the computer 1A1 or 1A2 via the communication section 16. The readout section 113 performs a readout process in accordance with the designation of data areas that is received from the computers 1A1 or 1A2 via the communication section 16. The determination section 114 performs the determination process for data that are read out by the readout section 113 and transmits a determination result to the computer that is an origin of the request of the determination process. The result of the determination process is data that satisfy the logical formula (or information that identifies the data, information that indicates a location of the data, and so forth) or data that indicate that no datum satisfying the logical formula is present, for example.

Figure 8:
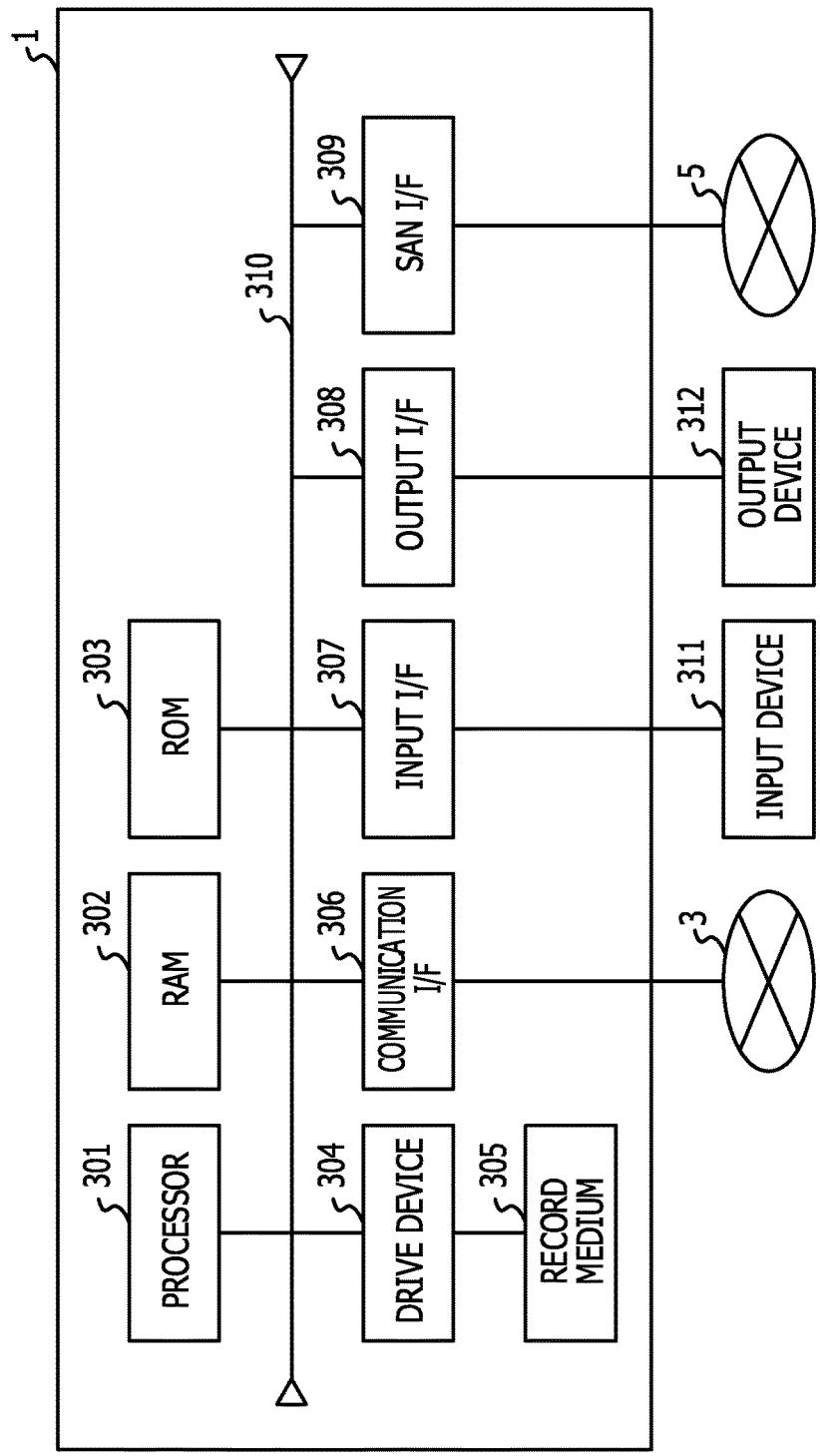
FIG. 8 illustrates an example of a hardware configuration of the computer 1.

FIG. 8 illustrates an example of a hardware configuration of the computer 1. The computer 1 includes a processor 301, a random access memory (RAM) 302, a read only memory (ROM) 303, a drive device 304, a recording medium 305, a communication interface (I/F) 306, an input interface (I/F) 307, an output interface (I/F) 308, a SAN interface (I/F) 309, and so forth, for example. Each piece of the hardware is coupled via a bus 310. The communication I/F 306 performs control of communication via the network 3. The SAN I/F 309 performs control of communication via the network 5. The input interface 307 is coupled with an input device 311 and transfers an input signal that is received from the input device 311 to the processor 301. The output interface 308 is coupled with an output device 312 and makes the output device 312 execute an output in response to a command of the processor 301.

The RAM 302 is a memory device that allows reading and writing. For example, semiconductor memories such as a static RAM (SRAM) and a dynamic RAM (DRAM) or flash memories or the like other than the RAM are used. The ROM 303 includes a programmable ROM (PROM) and so forth. The drive device 304 performs at least either one of readout of information that is recorded in the recording medium 305 and writing of information in the recording medium 305. The recording medium 305 stores the information that is written by the drive device 304. The recording medium 305 is a recording medium such as a hard disc, a compact disc (CD), a digital versatile disc (DVD), or a blu-ray disc, for example. Further, for example, it is sufficient that the computer 1 includes the drive device 304 and the recording medium 305 for each of plural kinds of recording media.

The input device 311 transmits an input signal in response to an operation. The input device is a key device such as a button that is mounted on a keyboard or a main body of the computer 1 or a pointing device such as a mouse or a touch panel, for example. The output device outputs information in response to control by the computer 1. The output device is an image output device (display device) such as a display or a sound output device such as a speaker. Further, for example, an input-output device such as a touch screen is used as the input device 311 and the output device 312.

The processor 301 reads out a program that is stored in the ROM 303 or the recording medium 305 to the RAM 302 and performs a process of the process section 11 following a procedure of the program that is read out. Then, the RAM 302 is used as a work area of the processor, and a function of the memory section 12 is implemented. The program that is read out by the processor 301 will be described with reference to FIG. 9.

Figure 9:
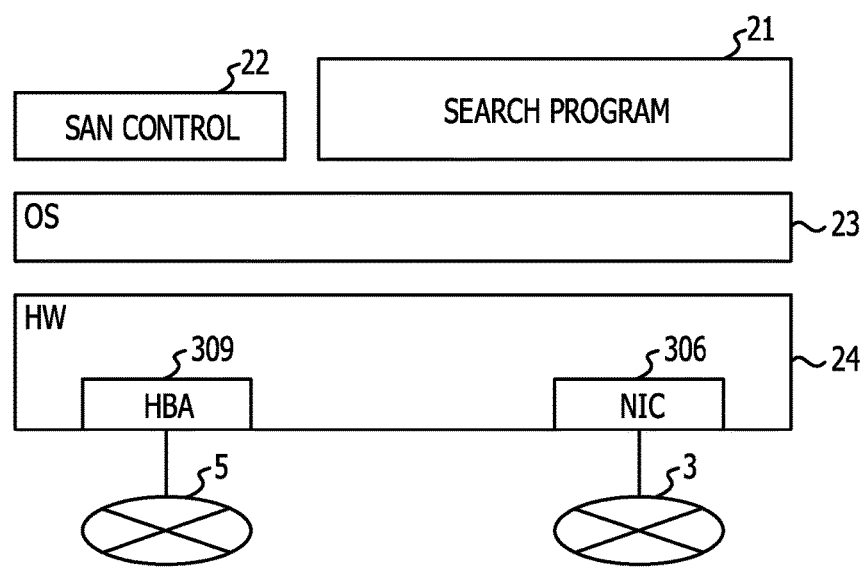
FIG. 9 illustrates an example of a software configuration of the computer 1.

FIG. 9 illustrates an example of a software configuration of the computer 1. In the computer 1, an operating system (OS) 23 that performs control of hardware 24 that is illustrated in FIG. 8 operates. The processor 301 operates in a procedure in accordance with the OS 23 to perform control and management of the hardware 24, and processes by application programs and middleware are executed by the hardware 24. In addition, in the computer 1, middleware such as a search program 21 or a SAN control program 22 is read out to the RAM 302 and executed by the processor 301, for example. The processor 301 performs processes based on the SAN control program 22, and the SAN I/F 309 such as a host bus adaptor (HBA) is thereby controlled so that a process of the communication section 14 is performed. Further, the processor 301 performs processes based on the search program 21 (performs those processes by controlling the hardware 24 based on the OS 23), and functions of the process section 11 (including the process sections 11A and 11B), the memory section 12 (including the memory sections 12A and 12B), the communication section 13, the communication section 14, the communication section 15, and the communication section 16 are thereby implemented. In the example of the software configuration that is illustrated in FIG. 9, the search program 21 and the SAN control program 22 are described as middleware. However, those may be included in the OS 23 as functions or may be application programs that operate on the OS 23.

The processor 301 writes data in the RAM 302 and so forth based on the search program 21, for example, and a function of the reception section 111 is thereby implemented. The processor 301 performs computation by using data that are stored in the RAM 302 based on the search program 21 and writes computation results in the RAM 302, for example, and a function of the generation section 112 is thereby implemented. The processor 301 controls the SAN I/F 309 based on the search program 21 and writes obtained data in the RAM 302, for example, and a function of the readout section 113 is thereby implemented. The processor 301 performs computation by using data that are stored in the RAM 302 based on the search program 21 and stores computation results in the RAM 302 or a register that is included in the processor 301, for example, and a function of the determination section 114 is thereby implemented. More specifically, the processor 301 reads out data that are stored in the RAM 302, performs computation based on the search program 21, and makes the register, the RAM 302, or the like retain computation results, for example, and a function of the logical determination section 1141 is thereby implemented. The processor 301 reads out data that are stored in the RAM 302, performs computation based on the search program 21, and makes the register and so forth retain computation results, for example, and a function of the statement determination section 1142 is thereby implemented. A function of the memory section 1143 is implemented by the register or the like that are included in the processor 301, for example. The processor 301 controls the communication I/F 306 to transmit data that are stored in the RAM 302 based on the search program 21, for example, and a function of the notification section 115 is thereby implemented.

FIG. 10 illustrates the management table T1. The management table T1 has a record for each search request. The record has items of "reception date and time", "search request origin", "search condition expression", "match table", and "search result", for example. Information that indicates the date and time when the reception section 111 receives the search request is stored in the item "reception date and time" by a process of the reception section 111, for example. Information that is stored in the item "reception date and time" may be used as information that identifies the search request. Information that identifies the computer that transmits the search request in the item "search request origin" by the process of the reception section 111, for example. The information that identifies the computer that transmits the search request is an IP address of the computer that transmits the search request, for example. For example, the notification section 115 uses information that is stored in the item "search request origin" of the management table T1 as a transmission destination of a result (response) of the search process. A pointer to the match table that is generated based on the search request is stored in the item "match table" by the process of the reception section 111, for example. The pointer is stored when the generation section 112 generates the match table, and the determination section 114 reads out information based on the pointer of the management table. Information that indicates a result of a process that is performed in response to the search request is stored in the item "search result" by the process of the reception section 111, for example. The information that indicates a result of a process is data that satisfy the logical formula of a search condition, information that identifies the data satisfying the logical formula or indicates a location of the data, information that indicates that no datum satisfying the logical formula is present, or the like, for example. In a case where the management table T1 is stored in the memory section 12A of the computer 1A1 that is illustrated in FIG. 6, information that indicates areas of data for which the computers 1B1 to 1B4 are requested to perform the determination process may further be included in the management table T1, for example. In addition, for example, items may be provided in the management table T1 such that the information that indicates a result of a process is stored for each of the computers 1B1 to 1B4.

FIGS. 11A, 11B, and 11C illustrate examples of the logical determination table. FIG. 11A illustrates the logical determination table T2a. The logical determination table T2a has a record for each node in the logical determination. A node in the logical determination is information that indicates a statement or an initial state of the logical determination, for example. The logical determination table T2a includes two initial states ("[true] start point" and "[false] start point") of the logical determination, for example. Each record has items of "node", "[true] child node", and "[false] child node". In each record, information that identifies a node is stored in the item "node". Information that identifies a node that is next determined whether "true" or not is stored in the item "[true] child node". Further, information that identifies a node that is next determined whether "false" or not is stored in the item "[false] child node". Information that indicates one or plural nodes is stored in each of the items "[true] child node" and "[false] child node". Further, in addition to the node that is next determined, information that indicates an end of the determination process ("[true] end point" and "[false] end point") is included in the items "[true] child node" and "[false] child node".

A description will be made about an example where the logical determination section 1141 traces the relationship among statements based on the logical determination table T2a. The logical determination section 1141 refers only to "[true] child node" when tracing starts from "[true] start point" and refers only to "[false] child node" when the tracing starts from "[false] start point". When the tracing starts from "[true] start point", the logical determination section 1141 selects any of the statements A, E, and F and reads out a determination result of the selected statement. The logical determination section 1141 may not select any of child nodes when plural child nodes are present but may perform parallel processing for tracing the relationship between each of the plural child nodes. When the statement A is selected and the determination result of the statement A is "true", the logical determination section 1141 further selects the statement B or the statement C. When the logical determination section 1141 selects the statement B and the determination result of the statement B is "false", the logical determination section 1141 terminates the tracing process from "[true] start point". Alternatively, the logical determination section 1141 may resume the process from the statements that are not selected (E, F, and C) in the tracing process from "[true] start point". When the tracing starts from "[false] start point", the logical determination section 1141 selects any of the statements A, B, and D and reads out a determination result of the selected statement. When the statement D is selected and the determination result of the statement D is "false", the logical determination section 1141 further selects the statement E. When the logical determination section 1141 selects the statement E and the determination result of the statement E is "true", the logical determination section 1141 terminates the tracing process from "[false] start point". Alternatively, the logical determination section 1141 may resume the process from the statements that are not selected (E, F, and C) in the tracing process from "[false] start point".

FIG. 11B illustrates the logical determination table T2b, and FIG. 11C illustrates the logical determination table T2c. The logical determination table T2b and the logical determination table T2c have a record for each node in the logical determination. A node in the logical determination is information that indicates a statement or an initial state (start point) of the logical determination, for example. Each record has items of "node", "determination result", and "child node". In each record, information that identifies a node is stored in the item "node". A determination result of the node is stored in the item "determination result". Further, information that identifies a node whose determination result is next referred to is stored in the item "child node". Information that indicates one node or information that indicates a determination result of an entire logical formula is stored in the item "child node".

An example of a process that is performed by the logical determination section 1141 illustrated in FIG. 4 will be described with reference to FIGS. 11B and 11C. The logical determination section 1141 traces the relationship from a start point of the logical determination table T2b in FIG. 11B and from a start point of the logical determination table T2c in FIG. 11C. From each start point, depending on the node and the determination result ("true" or "false") of the node, the logical determination section 1141 decides a child node that is next referred to. For example, the logical determination section 1141 selects a node "A" by referring to information of the start point of the logical determination table T2b. When the node "A" is selected, the logical determination section 1141 refers to the determination result of the node "A" of the statement determination section 1142. The logical determination section 1141 selects a node "B" in a case where the determination result of the node "A" is "true". When the logical determination section 1141 selects the node "B" and the determination result of the node "B" is "false", the logical determination section 1141 selects a node "C". After the node "C", the logical determination section 1141 performs tracing in the logical determination table T2*b* based on the determination result of the statement determination section 1142 and performs a determination of the entire logical formula. Meanwhile, the logical determination section 1141 performs tracing in the logical determination table T2*c* from the start point. When a child node "D" of the start point is selected, the logical determination section 1141 selects a child node "E" of the node "D" if the node "D" is determined as "false" by the statement determination section 1142. Then, if a node "E" is determined as "false" by the statement determination section 1142, the logical determination section 1141 selects a child node "F" of the node "E", for example. When a node "F" is selected and the node "F" is determined as "false" by the statement determination section 1142, the logical determination section 1141 determines the entire logical formula as "false". For example, if the node "D" is determined as "true", the logical determination section 1141 stops the process for tracing the relationship.

Figures 12A, 12B:
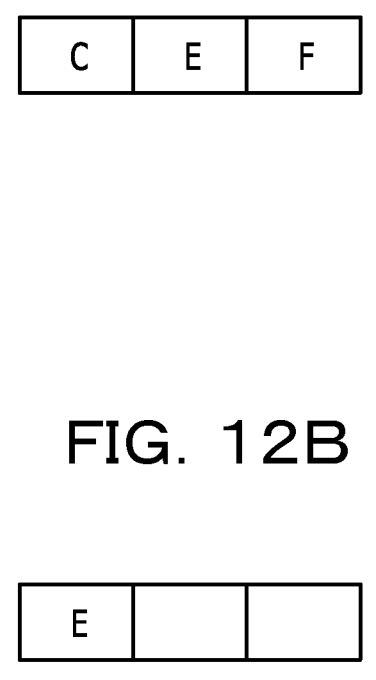

FIGS. 12A and 12B illustrate examples of state information. FIGS. 12A and 12B indicate the statements (nodes) whose determination results by the statement determination section 1142 are being referred to by the logical determination section 1141. Tables T3*a* and T3*b* that are illustrated in FIGS. 12A and 12B are retained in the memory section 1143. In cases where the relationship is traced by using FIG. 11A and where the relationship is traced by using FIGS. 11B and 11C, the logical determination section 1141 performs the processes while retaining two or more pieces of information that are indicated in FIGS. 12A and 12B in the memory section 1143. In a case where the relationship is traced by using FIG. 11A, the nodes that are obtained by performing tracing from "[true] start point" are retained in the table T3*a* illustrated in FIG. 12A, and the nodes that are obtained by performing tracing from "[false] start point" are retained in the table T3*b* illustrated in FIG. 12B. Further, in a case where the relationship is traced by using FIGS. 11B and 11C, a result that is obtained by performing tracing by using FIG. 11B is retained in the table T3*a* illustrated in FIG. 12A, and a result that is obtained by performing tracing by using FIG. 11C is retained in the table T3*b* illustrated in FIG. 12B. Further, in a case where a child node is selected by referring to the logical determination table T2, the logical determination section 1141 updates the information that is retained in the table T3 with information that identifies the selected child node.

FIG. 13 illustrates an example of the determination information. The memory section 1143 retains a table T4 that includes the determination information. The table T4 includes an area that stores the statements that are included in the logical formula and determination results for the statements. The statement determination section 1142 determines whether or not determination target data satisfy the statement and stores the determination result in the table T4.

Figure 14:
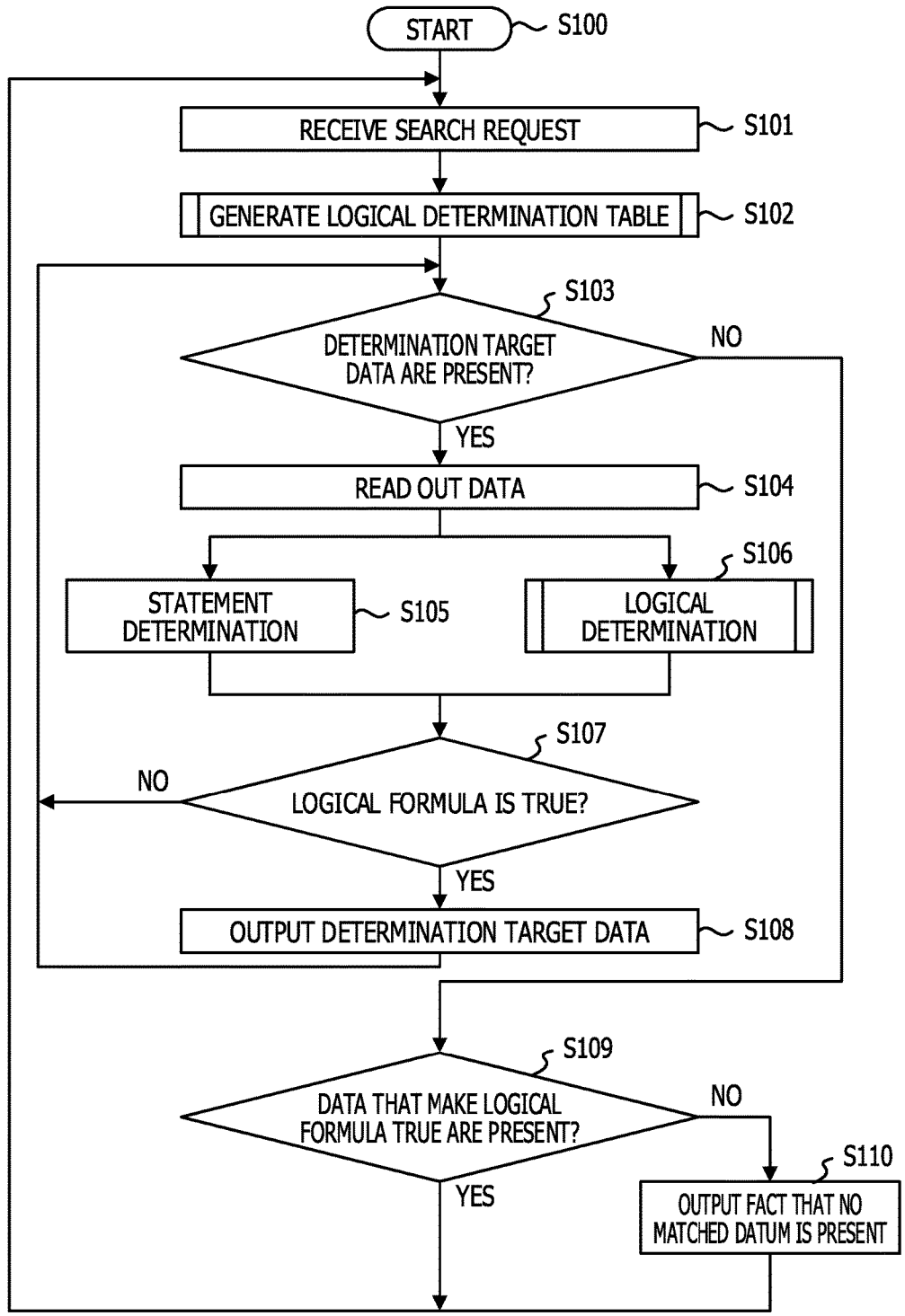
FIG. 14 illustrates an example of a flowchart that illustrates a flow of a response process.

A flow of an entire logical formula determination process will be described below. FIG. 14 is a flowchart that illustrates a flow of a response process to a search request by the computer 1. The computer 1 starts a process based on the search program 21 (S100). The reception section 111 receives a search request from the computer 4 (S101), and the generation section 112 then generates the logical determination table T2 (S102). The readout section 113 reads out determination target data of the logical formula that is included in the search request received by the reception section 111. The readout section 113 determines whether or not the determination target data are present (S103). If the determination target data are present, the readout section 113 extracts the determination target data (S104). The statement determination section 1142 that is included in the determination section 114 determines whether or not the determination target data that are extracted in S104 satisfy the statements included in the logical formula (S105). In S106, the logical determination section 1141 refers to a determination result in S105 and the logical determination table that is generated in S102 and determines whether or not the determination target data satisfy the entire logical formula (S106). If the logical formula is true (S107: Yes) after a process in S106 is finished, the determination section 114 writes the determination target data in the management table T1 (S108), and a process of S103 is next performed. If the logical formula is false (S107: No), a process of S108 is not performed, but the process of S103 is next performed. On the other hand, if the readout section 113 determines that the determination target data are not present (S103: No), determination is made whether or not data that make the logical formula true are present (S109). If the data that make the logical formula true are present (S109: Yes), a process of S101 is next performed. If the data that make the logical formula true are not present, information that indicates that data satisfying the logical formula are not present is written in the management table T1 (S110), and the process of S101 is next performed.

The process in which the generation section 112 generates the logical determination table will further be described below.

The process of generating the logical determination table T2*a* that is illustrated in FIG. 11A will first be described. The logical determination table T2*a* is a table that corresponds to directed acyclic graphs that are illustrated in FIGS. 15 and 16.

Figure 15:
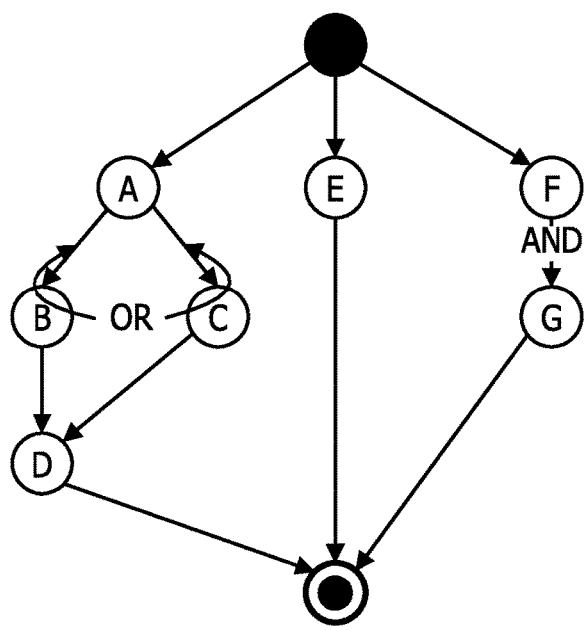
FIGS. 15 and 16 illustrate examples of directed acyclic graphs that correspond to a logical determination table.
Figure 16:
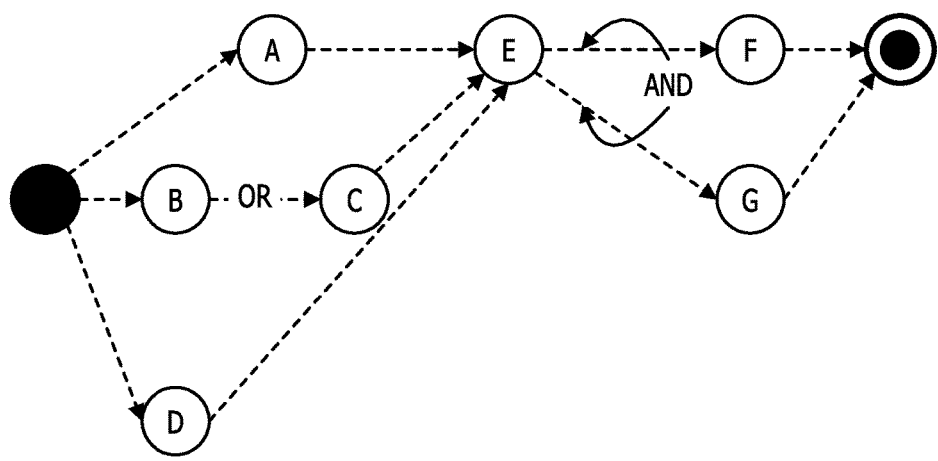

FIGS. 15 and 16 illustrate the directed acyclic graphs that correspond to the logical determination table T2*a*. The graph that is illustrated in FIG. 15 corresponds to paths that trace the relationship from a node "[true] start point" in FIG. 11A. In FIG. 11A, next to the node "[true] start point", the nodes "A", "E", and "F" as the items "[true] child nodes" are associated with the node "[true] start point". In FIG. 15, the nodes "A", "E", and "F" are placed under "[true] start point" (a black circle at the upper end in FIG. 15). Further, in FIG. 11A, the nodes "B" and "C" as the items "[true] child nodes" are associated with the node "A". In FIG. 15, the nodes "B" and "C" are placed under "A". Meanwhile, the graph that is illustrated in FIG. 16 corresponds to paths that trace the relationship from a node "[false] start point" in FIG. 11A. In FIG. 11A, next to the node "[false] start point", the nodes "A", "B", and "D" as the items "[false] child nodes" are associated with the node "[false] start point". In FIG. 16, the nodes "A", "B", and "D" are placed under "[false] start point" (a black circle at the left end in FIG. 16). In addition, in FIG. 11A, the node "E" as the item "[false] child node" is associated with the node "D". In FIG. 16, the node "E" is placed under "D". In the determination by the logical determination section 1141, the directed acyclic graphs that are illustrated in FIGS. 15 and 16 allow the determination to proceed to a next node only if the condition of each node is satisfied. Thus, referring to the directed acyclic graphs as "satisfiability (SAT) graph" may facilitate understanding of these graphs.

Figure 17:
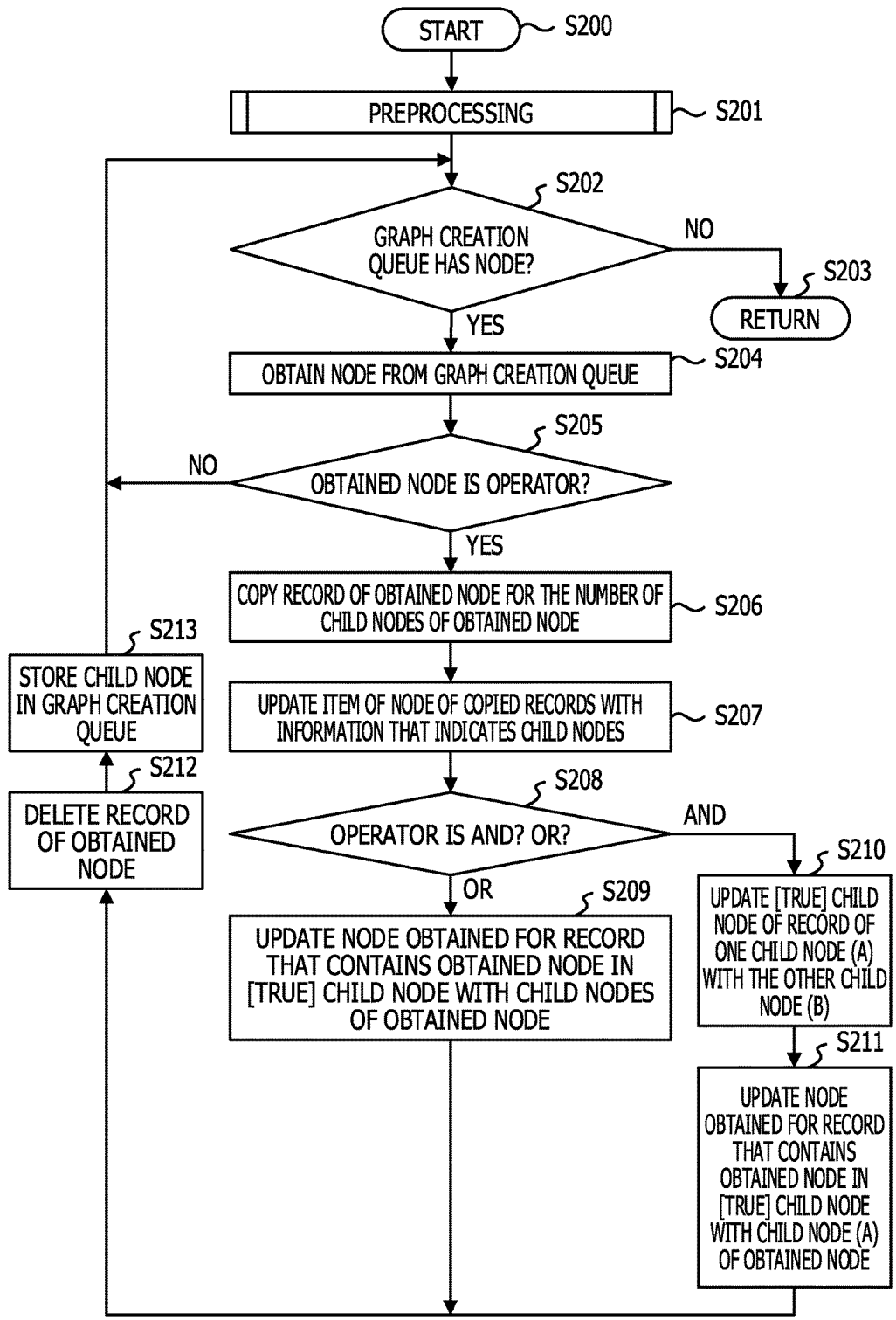
FIG. 17 illustrates an example of a flowchart of a process of a generation section.

FIG. 17 illustrates a flowchart of the process of generating the logical determination table T2*a*. The reception section 111 receives a search request and stores information in the management table T1 (S200), and the generation section 112 performs preprocessing for the generation of the logical determination table T2a (S201).

Figure 18:
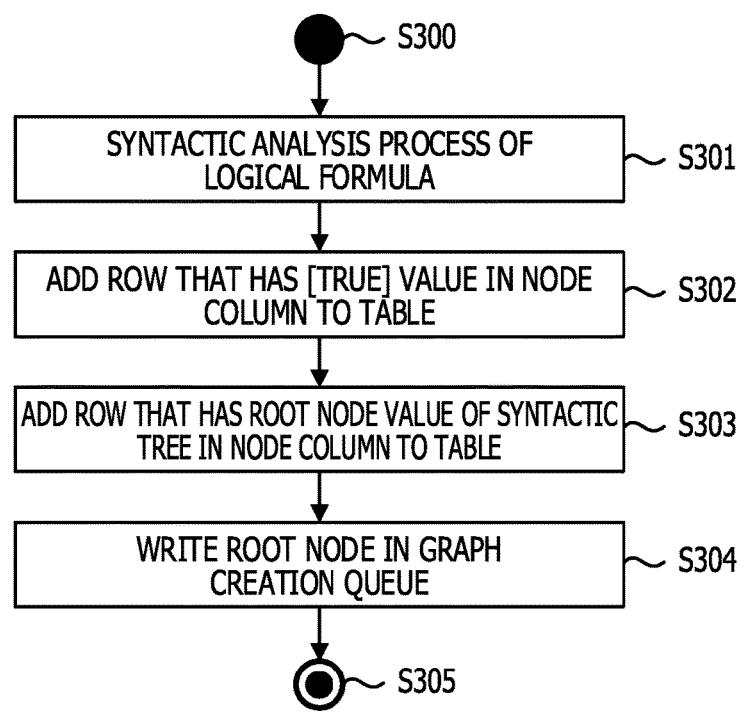
FIG. 18 illustrates an example of a flowchart of a process of S201 in FIG. 17.
Figure 19:
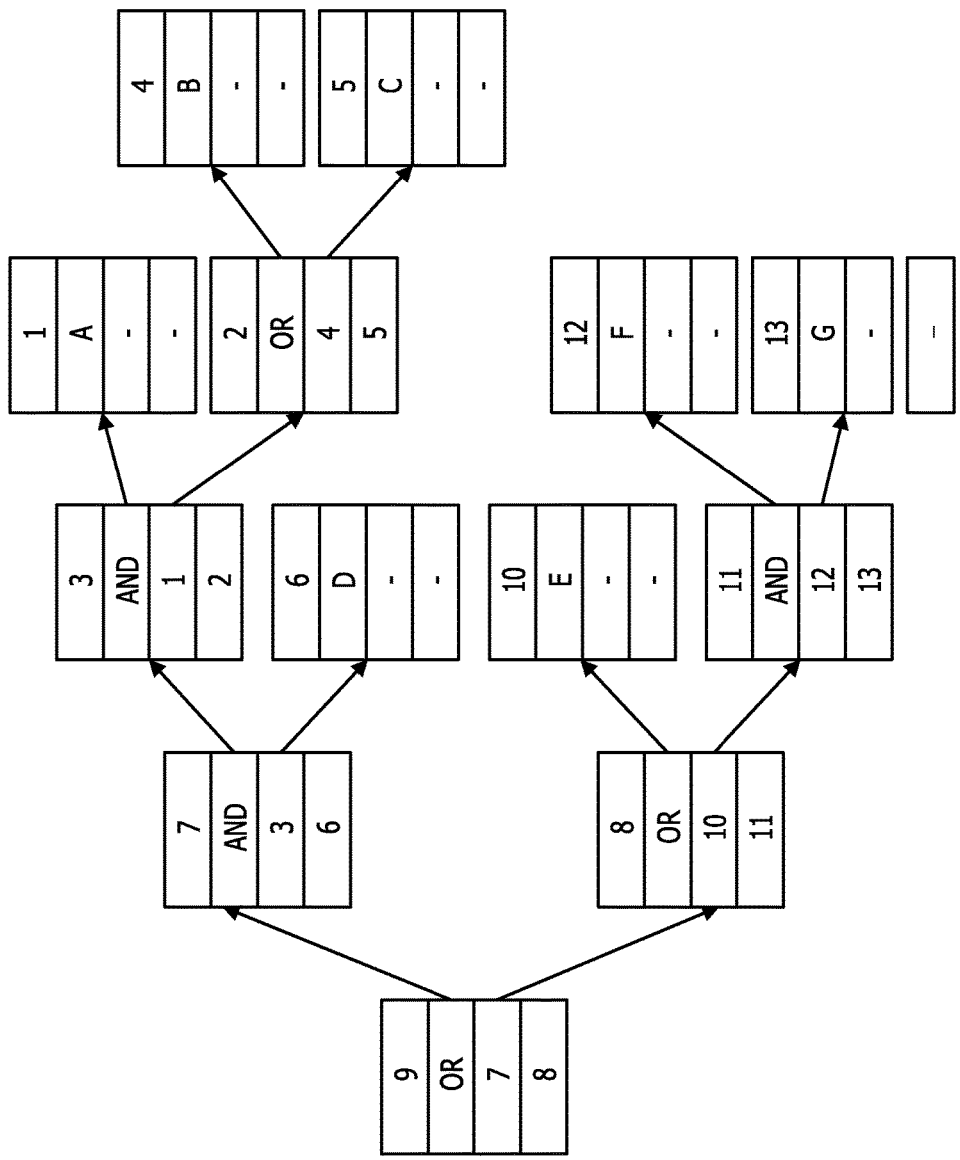
FIG. 19 illustrates an example of a syntactic analysis result of a logical formula.

FIG. 18 is a flowchart of the preprocessing of a logical determination process. When the preprocessing is started (S300), the generation section 112 performs a syntactic analysis process on a logical formula. For example, the syntactic analysis is performed on the logical formula "(A and (B or C) and D) or E or (F and G)", and directed acyclic graph data in FIG. 19 are obtained. When the directed acyclic graph that is illustrated in FIG. 19 is obtained, the generation section 112 stores the directed acyclic graph data in the memory section 12. In the directed acyclic graph in FIG. 19, data of leaf nodes represent the statements, data of internal nodes are logical operators, and the entire directed acyclic graph represents the connection relationship among the statements.

The directed acyclic graph data in FIG. 19 are generated by generating the directed acyclic graph with the nodes that are included in the logical formula sequentially from the beginning of the logical formula, for example. The generation section 112 generates the directed acyclic graph data for the section where "A" and "(B or C)" are connected by the logical AND operator in the logical formula "(A and (B or C) and D) or E or (F and G)", for example. The generation section 112 generates a data structure for "A", a data structure for "B or C", and a data structure for "and". The data structure for "A" includes pointer information that indicates the data structure itself (a pointer 1 in FIG. 19) and information that indicates the statement A. The data structure for "B or C" includes pointer information that indicates the data structure itself (a pointer 2 in FIG. 19) and information that indicates a partial logical formula "B or C". The data structure for "and" includes pointer information that indicates the data structure itself (a pointer 3 in FIG. 19), information that indicates the operator "and", the pointer information (pointer 1) of the data structure for "A", and the pointer information (pointer 2) of the data structure for "B or C".

For "B or C" for which the data structure is generated, a further syntactic analysis is performed because "B or C" is a logical formula. The generation section 112 generates a data structure for "B", a data structure for "C", and a data structure for "or" based on the logical formula "B or C". The data structure for "B" includes pointer information that indicates the data structure itself (a pointer 4 in FIG. 19) and information that indicates the statement B. The data structure for "C" includes pointer information that indicates the data structure itself (a pointer 5 in FIG. 19) and information that indicates the statement C. The data structure for "or" includes pointer information that indicates the data structure itself (the pointer 2 in FIG. 19), information that indicates the operator "or", the pointer information (pointer 4) of the data structure for "B", and the pointer information (pointer 5) of the data structure for "C".

The generation section 112 further analyzes sections yet to be analyzed in the logical formula in a similar procedure to generate the directed acyclic graph data. For example, the generation section 112 further generates the directed acyclic graph data for the sections where the statement D is connected by "and" with respect to "A and (B or C)" that is already analyzed. For example, the data structure for "and" includes pointer information that indicates the data structure for the statement D and the pointer information (the pointer 3 in FIG. 19) of the data structure for "and" that is previously generated. In the above example, a procedure in which the directed acyclic graph data is generated from the beginning of the logical formula is described. However, the generation of the directed acyclic graph data is not limited to this procedure, but memory image data may be generated from the end of the logical formula.

When the directed acyclic graph data is generated by performing the syntactic analysis of the logical formula in the above procedure, the generation section 112 secures a memory area in the memory section 12 and adds a record that has "[true] start point" as the content of the item "node" and a record that has "[false] start point" as the content of the item "node" in the secured memory area (S302). Then, the generation section 112 adds a record of the highest node ("root" node) of the directed acyclic graph data that are generated in S301 (S303). In this process, the generation section 112 stores information that indicates the "root" node in the item "[true] child node" in the record that has "[true] start point" as the content of the item "node" in the logical determination table T2a and adds "[true] end point" to the item "[true] child node" in the record that has the "root" node as the content of the item "node". Further, the generation section 112 adds information that indicates the "root" node in the item "[false] child node" in the record that has "[false] start point" as the content of the item "node" in the logical determination table T2a and adds "[false] end point" to the item "[false] child node" in the record that has the "root" node as the content of the item "node". After a process of S303, the generation section 112 prepares a queue (graph creation queue) and stores information that indicates the "root" node in the prepared queue (S304). After a process of S304 is finished, the generation section 112 returns to the process of the flowchart that is illustrated in FIG. 17 (S305).

After a process of S201, the generation section 112 determines whether or not a node is stored in the graph creation queue (S202). If a node is not stored in the graph creation queue (S202: No), the flow in FIG. 17 is finished (S203). If a node is stored in the graph creation queue (S202: Yes), the generation section 112 obtains one node from the graph creation queue (S204). For example, the "root" node is obtained in a first process. Next, the generation section 112 determines whether or not the obtained node is a logical operator (S205). If the obtained node is not an operator (S205: No), the generation section 112 returns to a process of S202. On the other hand, if the obtained node is an operator (S205: Yes), the generation section 112 prepares copies of a record that has information indicating the obtained node as the content of the item "node" for the number of child nodes of the obtained node (S206). In a process of S206, the generation section 112 determines the number of child nodes by referring to the data of the directed acyclic graph in FIG. 19. For example, the number of child nodes of the "root" node is two because the "root" node has two pointers of child nodes (pointer 7 and pointer 8). After the process of S206, the generation section 112 updates the item "node" of records that are obtained by copying with information that indicates the child nodes (S207). For example, in a case where the obtained node is the "root" node, the generation section 112 updates the contents of the item "node" of the records that are obtained by copying with the "and" node of the pointer 7 and an "or" node of the pointer 8.

After a process of S207, the generation section 112 performs determination of whether the obtained node is the logical AND operator or the logical OR operator (S208). If the obtained node is the logical OR operator (S208: "OR"), the generation section 112 extracts a record that has information indicating the obtained node in the item "[true] child node" as the content and updates the information indicating the obtained node that is included in the item "[true] child node" of the record with information that indicates the child node of the obtained node (S209). For example, in a case where the obtained node is the "root" node, the "or" node of a pointer 9 is removed, and the "and" node of the pointer 7 and the "or" node of the pointer 8 are added.

On the other hand, if the obtained node is the logical AND operator (S208: "AND"), the generation section 112 updates the content of the item "[true] child node" of a record of one child node "A" of child nodes of the obtained node with information that indicates the other child node "B" (S210). Then, after a process of S210, the generation section 112 extracts a record that has information that indicates the obtained node in the item "[true] child node" as the content and updates the information indicating the obtained node that is included in the item "[true] child node" of the record with information that indicates the one child node "A" in the process of S210 (S211). For example, in a case where the obtained node is the "and" node of the pointer 7, the "and" node of the pointer 7 is removed, and the "and" node of the pointer 3 is added. In such a case, information that indicates the statement D of a pointer 6 is stored in the item "[true] child node" of a record of the "and" node of the pointer 3.

After a process of S211 or S209, the generation section 112 deletes the record of the obtained node (S212), stores the child node of the obtained node in the graph creation queue (S213), and returns to the process of S202. In a process of S213, for example, in a case where the obtained node is the "root" node, the "and" node of the pointer 7 and the "or" node of the pointer 8 are added to the graph creation queue. In the above-described process, the processes of S210 and S211 may be exchanged in an execution order, processes of S212 and S213 may also be exchanged in the execution order.

Figure 20A:
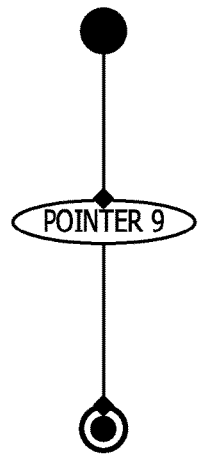
FIGS. 20A, 20B, 20C, 20D, 20E, and 20F illustrate processes of generation of directed acyclic graphs in FIG. 15.
Figure 20B:
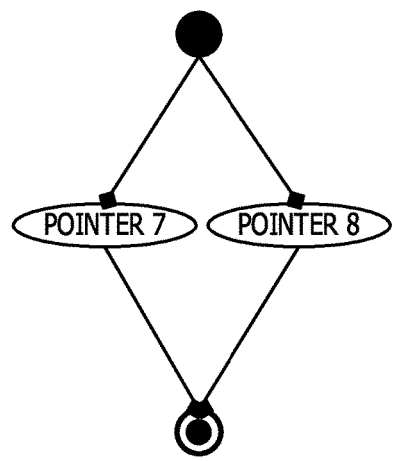
Figure 20C:
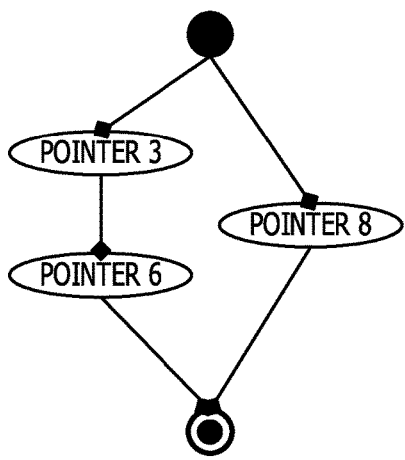
Figure 20D:
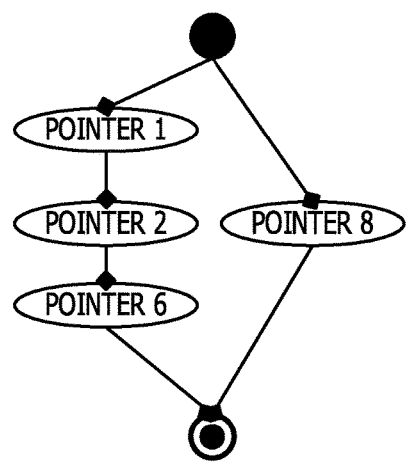
Figure 20E:
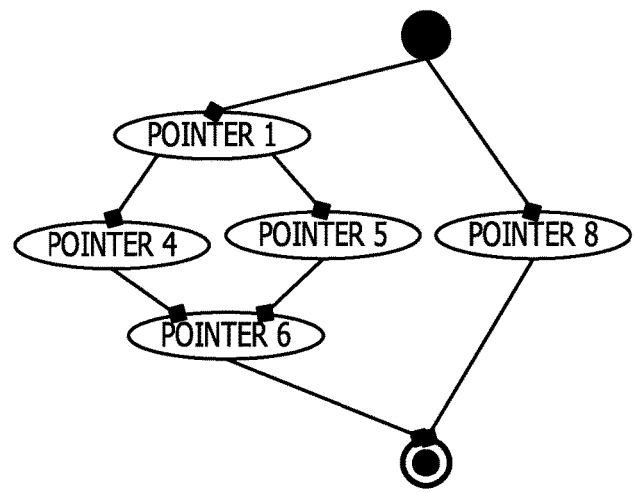
Figure 20F:
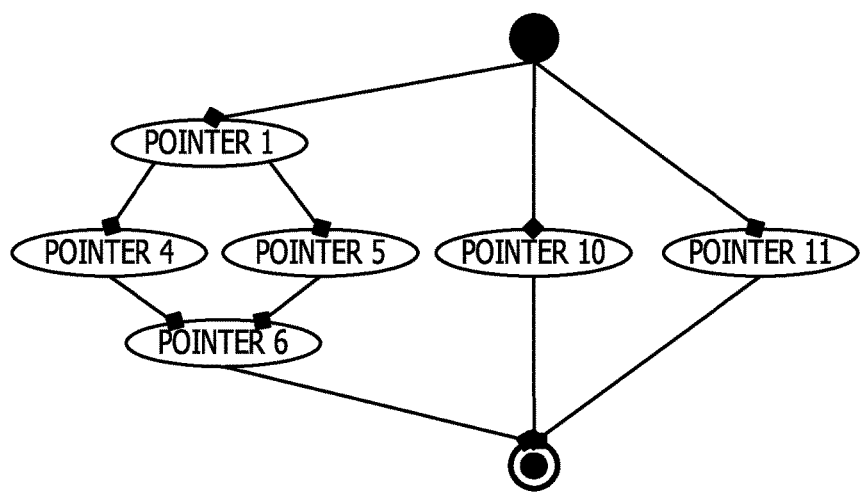

The generation section 112 repeats the processes of S202 to S213 that are illustrated in FIG. 17, and the logical determination table T2*a* is thereby generated. A process of the generation will be described with reference to a directed acyclic graph that corresponds to the logical determination table T2*a* that is illustrated in FIG. 15. For example, a graph (in a case where a relationship is traced from "[true] start point") that is generated based on the logical determination table T2*a* after the process of S201 becomes a graph illustrated in FIG. 20A. At this point, information that indicates the "root" node (for example, the pointer 9) is stored in the graph creation queue. The generation section 112 performs the processes of S202 to S213, information about the "or" node of the pointer 9 that is the "root" node is replaced with the "and" node of the pointer 7 and the "or" node of the pointer 8 that are child nodes of the "or" node of the pointer 9. FIG. 20B illustrates a graph that corresponds to the logical determination table T2*a* at this point. In FIG. 20B, the "and" node of the pointer 7 and the "or" node of the pointer 8 are related to "[true] start point". Then, the generation section 112 performs the processes of S202 to S213, information about the "and" node of the pointer 7 is replaced with the "and" node of the pointer 3 and the statement D of the pointer 6. FIG. 20C illustrates a graph that corresponds to the logical determination table T2*a* at this point. Then, the generation section 112 performs the processes of S202 to S213, information about the "and" node of the pointer 3 is replaced with the statement A of the pointer 1 and the "or" node of the pointer 2. FIG. 20D illustrates a graph that corresponds to the logical determination table T2*a* at this point. In a case where the node of the statement D of the pointer 6 is obtained from the graph creation queue, update of the logical determination table T2*a* is not performed due to a determination in S205. Then, the generation section 112 performs the processes of S202 to S213, information about the "or" node of the pointer 2 is replaced with the statement B of the pointer 4 and the statement C of the pointer 5. FIG. 20E illustrates a graph that corresponds to the logical determination table T2*a* at this point. The "or" node of the pointer 8 is stored in the graph creation queue by the process of S213 in a case where the "root" node (the "or" node of the pointer 9) is obtained from the graph creation queue. The generation section 112 performs the processes of S202 to S213 in a case where the "or" node of the pointer 8 is obtained from the graph queue, information about the "or" node of the pointer 8 is replaced with the statement E of a pointer 10 and the "and" node of a pointer 11. FIG. 20F illustrates a graph that corresponds to the logical determination table T2*a* at this point. Then, the generation section 112 performs the processes of S202 to S213 in a case where the "and" node of the pointer 11 is obtained from the graph queue, information about the "and" node of the pointer 11 is replaced with the statement F of a pointer 12 and the statement G of a pointer 13. A graph that corresponds to the logical determination table T2*a* at this point is the graph that is illustrated in FIG. 15.

Figure 21:
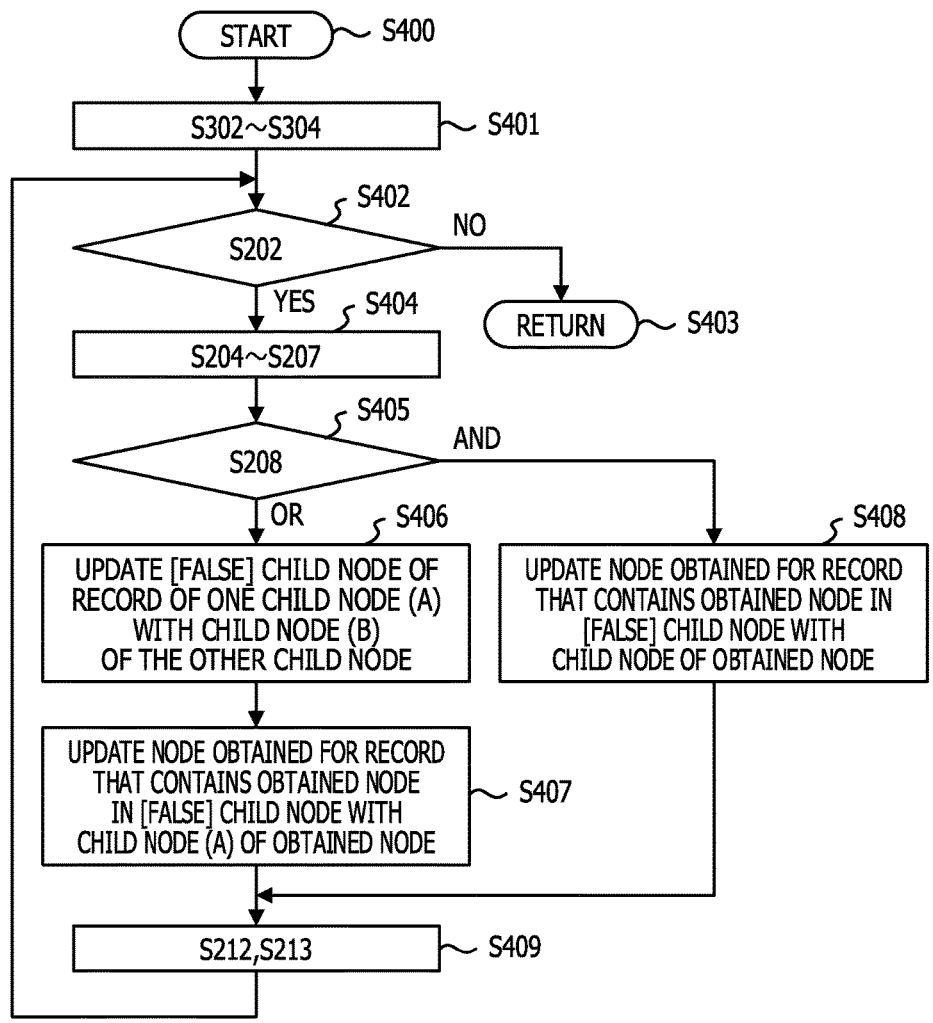
FIGS. 21 and 22 illustrate examples of a flowchart of a process of the generation section.

FIG. 21 illustrates a flowchart of the process of generating the logical determination table T2*a* that is used for tracing a relationship from the node "[false] start point". After the process that is illustrated in the flowchart in FIG. 17 is finished, the generation section 112 starts a process of the flowchart that is illustrated in FIG. 21 (S400). The generation section 112 first performs processes of S302 to S304 that are illustrated in FIG. 18 (S401). In the process of S302 that is included in S401 in FIG. 21, the generation section 112 adds a row that has a [false] value in a node column. The generation section 112 next performs the process of S202 that is illustrated in FIG. 17 (S402). If the determination in S402 is Yes (S402: Yes), the generation section 112 performs the processes of S204 to S207 (S404). If the determination in S202 is No (S402: No), the process of the flowchart in FIG. 21 is finished (S403). After a process of S404 is finished, the generation section 112 makes the determination in S208 that is illustrated in FIG. 17 (S405). If a determination is made that a determination target operator is the logical OR operator as a result of the determination in S405, the generation section 112 updates the content of the item "[false] child node" of a record of one child node "A" of obtained child nodes with information that indicates the other child node "B" (S406). In addition, after a process of S406, the generation section 112 extracts a record that has information that indicates the obtained node in the item "[false] child node" as the content and updates the information indicating the obtained node that is included in the item "[false] child node" of the record with information that indicates the one child node "A" in the process of S406 (S407). If a determination is made that a determination target operator is the logical AND operator as a result of the judgment in S405 (S405: AND), the generation section 112 performs a process of S408. That is, the generation section 112 extracts a record that has information indicating the obtained node in the item "[false] child node" as the content and updates the information indicating the obtained node that is included in the item "[false] child node" of the record with information that indicates the child node of the obtained node (S408). When those processes are compared to the generation of the logical table T2*a* that is used for tracing a relationship from "[true] start point", the process that is performed for the logical OR operator and the process that is performed for the logical AND operator are in reverse positions. After a process of S407 or S408 is finished, the generation section 112 performs the processes of S212 and S213 (S409) and returns to the process of S402. The logical determination tables that are generated in the above procedures (the flowcharts that are depicted in FIGS. 17, 18, and 21) are merged together, thereby generating the logical determination table T2a that is illustrated in FIG. 11A. Further, the logical determination table T2a that is illustrated in FIG. 11A may be generated by simultaneously performing the processes based on the flowcharts that are depicted in FIGS. 17, 18, and 21.

Figure 22:
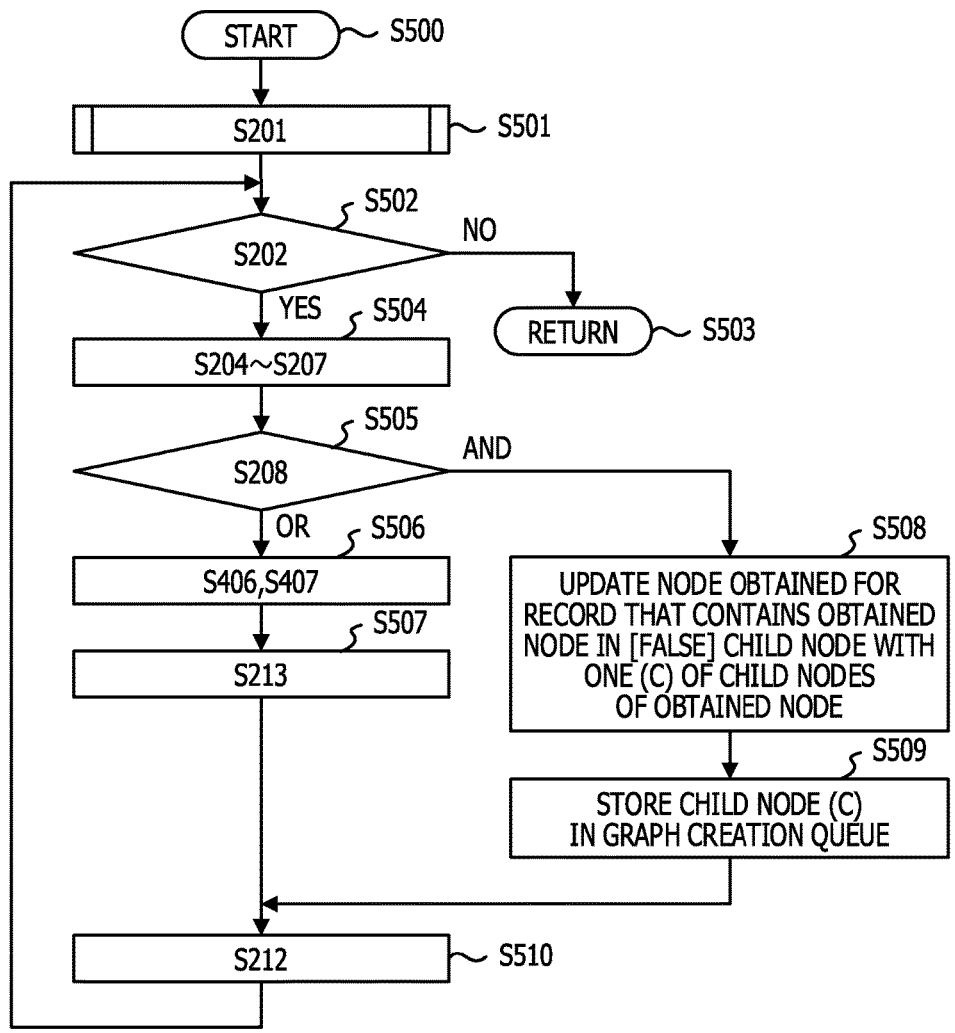

A process of generating the logical determination table T2c that is illustrated in FIG. 11C will next be described based on a flowchart in FIG. 22. The logical determination table T2b in FIG. 11B has a table structure that corresponds to the BDD illustrated in FIG. 1 and may be generated by various methods of generating a BDD. The reception section 111 first receives a search request and stores information in the management table T1, and the generation section 112 then starts a process that is illustrated in FIG. 22 (S500) and performs the process of S201 (S501). In the process of S501, similarly to S401, the generation section 112 adds a row that has a [false] value in the node column in the process of S302 that is included in S501. The generation section 112 next makes the judgment in S202 (S502). If the result of the judgment in S202 is No (S502: No), the generation section 112 finishes the process (S503). If the result of the judgment in S202 is Yes (S502: Yes), the generation section 112 performs the processes of S204 to S207 (S504). After a process of S504, the generation section 112 makes the judgment in S208 (S505). If the judgment is made in S505 that the operator is the logical OR operator, the generation section 112 performs the processes of S406 and S407 (S506) and further performs the process of S213 (S507). On the other hand, if the judgment is made in S505 that the operator is the logical AND operator, the generation section 112 extracts a record that has information indicating the obtained node in the item "[false] child node" as the content and updates the information indicating the obtained node that is included in the item "[false] child node" of the record with information that indicates one of child nodes (child node "C") of the obtained node (S508). After a process of S508, the generation section 112 stores information that indicates the child node "C" in the graph creation queue (S509). After a process of S507 or S509, the generation section 112 performs the process of S212 (S510) and returns to a process of S502.

The logical determination table T2c is a table that includes one path that starts from "[false] start point" in the logical determination table T2a. When a falsity determination process that uses the logical determination table T2c is combined with a determination process based on the BDD in related art, a result may more quickly be obtained by the falsity determination process that uses the logical determination table T2c than the determination process based on the BDD. In such a case, it may be understood that a determination result of a logical formula is more quickly obtained than the determination process based on the BDD in related art.

In a case where a logical negation operator (NOT) is applied to a statement in a logical formula of a search request that is received by the reception section 111, the generation section 112 assumes a set of the logical negation operator and the statement as one statement and generates the logical determination table T2. For example, "not A" is assumed as one statement. In addition, in a case where the negation operator is applied to a logical formula, the generation section 112 converts the logical formula into a form in which the logical negation operator is applied to an individual statement by using De Morgan's law before the syntactic analysis is performed. Further, for the statement to which the logical negation operator is applied, the statement determination section 1142 determines whether the original statement is true or false, inverts the determination result, and outputs the result. For example, with respect to "not A", the statement determination section 1142 determines that the determination result is false if the result of a true-false determination of the statement A is true and determines that the determination result is true if the result of the true-false determination of the statement A is false.

The determination process that is performed by the determination section 114 will further be described below.

The statement determination section 1142 first performs a processes of S105 that is illustrated in FIG. 14. First, in the process of S105, the statement determination section 1142 secures a memory area for the table T4 in the memory section 1143 or memory section 12. Next, the statement determination section 1142 generates a record for each statement that is included in a logical formula in the table T4. Then, a determination is made whether or not the statement is included in determination target data for each statement that is included in the logical formula, and the statement determination section 1142 stores the determination result in the table T4. The statement determination section 1142 finishes the process when the determinations of all the statements that are included in the logical formula are finished or a determination of the logical formula is finished.

Next, the logical determination section 1141 performs a process of S106 that is illustrated in FIG. 14. FIG. 23 illustrates a flowchart of a logical determination process by using the logical determination table T2a of S106. When the readout section 113 reads out determination target data (S601), the logical determination section 1141 secures a memory area for the tables T3a and T3b in the memory section 1143 or the memory section 12. Then, the logical determination section 1141 refers to the logical determination table T2a that is stored in the memory section 12, stores the node in the item "[true] child node" in a record that has the node "[true] start point" as the content in the table T3a, and stores the node that is stored in the item "[false] child node" of a record that has the node "[false] start point" as the content in the table T3b (S602). When a process of S602 is performed, the logical determination section 1141 performs parallel processing of processes of S603 to S610 and processes of S611 to S618. In addition, for example, each of the processes of S603 to S610 and the processes of S611 to S618 may be performed by parallel and multiple processing. That is, plural processor cores may individually perform the processes of S603 to S610, and other plural processor cores may individually perform the processes of S611 to S618.

The logical determination section 1141 determines whether information that indicates stop is absent in a prescribed area that is secured in the memory section 1143 (whether a stop flag is absent) (S603). If the information that indicates stop is stored (S603: No), the logical determination section 1141 skips the processes of S604 to S610. If the information that indicates stop is absent (S603: Yes), the logical determination section 1141 reads out one node that is stored in the table T3a (S604). In a case where parallel processing is performed on the processes of S603 to S610, control in which the node that is read out in S604 is not read out by the other processor cores may be performed. When a process of S604 is performed, the logical determination section 1141 reads out the determination result for the node that is read out in S604 from the table T4 (S605). If the determination result that is read out in S605 is "true" (S605: Yes), the logical determination section 1141 performs the process of S607. If the determination result that is read out in S605 is "false" or the determination result may not be read out (the statement determination section 1142 is yet to store the determination result) (S605: No), the logical determination section 1141 returns to the process of S603. The logical determination section 1141 reads out the node that is stored in the item "[true] child node" of the record for the node that is read out in S604 from the logical determination table T2a (S607). After the process of S607, the logical determination section 1141 updates the information of the node that is stored in the table T3a and read out in S604 with information of the node that is read out in S607 (S608). Then, the logical determination section 1141 determines whether or not the node that is read out in S607 is "[true] end point" (S609). If the node that is read out in S607 is not "[true] end point" (S609: No), the logical determination section 1141 returns to S603 and performs the process. If the node that is read out in S607 is "[true] end point" (S609: Yes), the judgment is made that the logical formula is "true" with respect to the determination target data, and the information that indicates stop is stored in the prescribed area in the memory section 1143 (S610). After a process of S610, the logical determination process is finished (S619).

The logical determination section 1141 performs the processes of S603 to S610 and simultaneously performs the processes of S611 to S618. The logical determination section 1141 determines whether information that indicates stop is absent in a prescribed area that is secured in the memory section 1143 (whether a stop flag is absent) (S611). If the information that indicates stop is stored (S611: No), the logical determination section 1141 skips the processes of S612 to S618. If the information that indicates stop is absent (S611: Yes), the logical determination section 1141 reads out one node that is stored in the table T3b (S612). In a case where parallel processing is performed on the processes of S611 to S618, control in which the node that is read out in S612 is not read out by the other processor cores may be performed. When the process of S612 is performed, the logical determination section 1141 reads out the determination result for the node that is read out in S612 from the table T4 (S613). If the determination result that is read out in S613 is "false" (S614: Yes), the logical determination section 1141 performs the process of S615. If the determination result that is read out in S613 is "true" (S614: No), the logical determination section 1141 returns to the process of S611 in a similar manner to the case where the determination result may not be read out in S605 (the statement determination section 1142 is yet to store the determination result). The logical determination section 1141 reads out the node that is stored in the item "[false] child node" of the record for the node that is read out in S612 from the logical determination table T2a (S615). After the process of S615, the logical determination section 1141 updates the information of the node that is stored in the table T3b and read out in S612 with information of the node that is read out in S615 (S616). Then, the logical determination section 1141 determines whether or not the node that is read out in S615 is "[false] end point" (S617). If the node that is read out in S615 is not "[false] end point" (S617: No), the logical determination section 1141 returns to S611 and performs the process. If the node that is read out in S615 is "[false] end point" (S617: Yes), the judgment is made that the logical formula is "false" with respect to the determination target data, and the information that indicates stop is stored in the prescribed area in the memory section 1143 (S618). After the process of S618, the logical determination process is finished (S619).

The logical determination process by using the logical determination tables T2b and T2c are performed in almost the same manner as the flowchart in FIG. 23. In this case, the logical determination section 1141 reads out the node in S607 by referring to the logical determination table T2b, for example. Then, the logical determination section 1141 omits the determination process of S606 and reads out the node from the logical determination table T2b in S607 depending on the determination result that is read out in S605, for example. Further, the logical determination section 1141 reads out data in S615 by referring to the table T2c, for example.

An efficient determination process of a logical formula is achieved by the above process. A configuration of the process is not limited to the above-described embodiment but may appropriately be modified within a scope in which the technology of the disclosure is enabled.

For example, most determination target data are normal data in a case where abnormal data are detected. Thus, the most determination target data may be considered as "true" with respect to a logical formula. Using the logical determination table T2a rather than the logical determination tables T2b and T2c reduces the number of statements that desire determination results for achieving a true-false determination of the logical formula compared to a determination by using the BDD (determinations are performed in a defined order in the BDD). Thus, a faster average determination speed may be expected.

Further, in such a case, the logical determination section 1141 may not perform the processes of S611 to S618. In a case where determination results for all the nodes that are included in the logical formula are referred to in S604 and S605 but the node "[true] end point" is not reached, the logical formula may be determined as "false". In a case where the logical formula is mostly "true" and it is desired to more quickly determine the logical formula as "true" as described above, the processes of S611 to S618 may not be performed. On the other hand, in a case where the logical formula is mostly "false" and it is desired to more quickly determine the logical formula as "false", the processes of S603 to S610 may not be performed.

Further, a determination of a logical formula (for example, the BDD) may be combined with a determination of whether or not each of statement groups that is used for determining the entire logical formula as "true" is satisfied. For example, a determination of the statement E (alternatively, "A and B and D" or the like) is made in parallel with a determination of the logical formula "(A and (B or C) and D) or E or (F and G)", and a determination process of the logical formula may be finished when a determination result of either one is obtained. A logical determination table that is used in this case is generated when the generation section 112 performs S206, S207, and S213 for one of child nodes in a case where the node that is obtained in S204 is the "or" node, for example.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A determination method executed by a computer, the determination method comprising:
   receiving a request to perform a data determination process to determine whether data stored in a storage device satisfies a logical formula, the logical formula being a logical disjunction of a plurality of statement groups, each of the plurality of statement groups being a statement or a logical conjunction of a plurality of statements;
   extracting a plurality of extracted statements by extracting at least one statement from each of the plurality of statement groups;
   determining whether the data satisfies each of the plurality of extracted statements;
   determining that the data does not satisfy the logical formula, when the data does not satisfy each of the plurality of extracted statements; and
   terminating the data determination process, when determined that the data does not satisfy the logical formula.

2. The determination method according to claim 1, further comprising:
   performing the data determination process based on one method in parallel with the determining whether the data satisfies each of the plurality of extracted statements.

3. The determination method according to claim 2, further comprising:
   terminating the data determination process based on the one method, when a result of the data determination process based on the one method is obtained before the data is determined not to satisfy the plurality of extracted statements.

4. The determination method according to claim 2, further comprising:
   executing determination processes for each of the plurality of extracted statements in parallel.

5. A system comprising:
   a memory; and
   a processor coupled to the memory and configured to:
      receive a request to perform a data determination process to determine whether data stored in a storage device satisfies a logical formula, the logical formula being a logical disjunction of a plurality of statement groups, each of the plurality of statement groups being a statement or a logical conjunction of a plurality of statements, and
      extract a plurality of extracted statements by extracting at least one statement from each of the plurality of statement groups;
      determine whether the data satisfies each of the plurality of extracted statements;
      determine that the data does not satisfy the logical formula, when the data does not satisfy each of the plurality of extracted statements; and
      terminate the data determination process, when determined that the data does not satisfy the logical formula.

6. The system according to claim 5, wherein the processor is configured to perform the data determination process based on one method in parallel with the determining whether the data satisfies each of the plurality of extracted statements.

7. The system according to claim 6, wherein the processor is configured to terminate the data determination process based on the one method, when a result of the data determination process based on the one method is obtained before the data is determined not to satisfy the plurality of extracted statements.

8. The system according to claim 6, wherein the processor is configured to execute determination processes for each of the plurality of extracted statements in parallel.

9. The system according to claim 5, the system further comprising:
   a storage device storing one or more target data,
   wherein the processor is configured to perform the data determination process of the logical formula with regard to the one or more target data.

10. A non-transitory computer-readable recording medium storing a program that causes a computer execute a process, the process comprising:
    receiving a request to perform a data determination process to determine whether data stored in a storage device satisfies a logical formula, the logical formula being a logical disjunction of a plurality of statement groups, each of the plurality of statement groups being a statement or a logical conjunction of a plurality of statements; and
    extracting a plurality of extracted statements by extracting at least one statement from each of the plurality of statement groups;
    determining whether the data satisfies each of the plurality of extracted statements;
    determining that the data does not satisfy the logical formula, when the data does not satisfy each of the plurality of extracted; and
    terminating the data determination process, when determined that the data does not satisfy the logical formula.

11. The non-transitory computer-readable recording medium according to claim 10, the process further comprising:
    performing the data determination process based on one method in parallel with the determining whether the data satisfies each of the plurality of extracted statements.

12. The non-transitory computer-readable recording medium according to claim 11, the process further comprising:
    terminating the data determination process based on the one method, when a result of the data determination process based on the one method is obtained before the data is determined not to satisfy the plurality of extracted statements.

13. The non-transitory computer-readable recording medium according to claim 12, the process further comprising:
    executing determination processes for each of the plurality of extracted statements in parallel.

* * * * *